(12) United States Patent
Watanabe

(10) Patent No.: US 9,541,389 B2
(45) Date of Patent: Jan. 10, 2017

(54) CENTER-OF-GRAVITY DETECTING SYSTEM

(75) Inventor: Yutaka Watanabe, Tokyo (JP)

(73) Assignee: NATIONAL UNIVERSITY CORPORATION TOKYO UNIVERSITY OF MARINE SCIENCE AND TECHNOLOGY, Tokyo (JP)

( * ) Notice: Subject to any disclaimer, the term of this patent is extended or adjusted under 35 U.S.C. 154(b) by 1047 days.

(21) Appl. No.: 13/698,633

(22) PCT Filed: May 17, 2011

(86) PCT No.: PCT/JP2011/002734
§ 371 (c)(1),
(2), (4) Date: Feb. 4, 2013

(87) PCT Pub. No.: WO2011/145332
PCT Pub. Date: Nov. 24, 2011

(65) Prior Publication Data
US 2013/0132025 A1 May 23, 2013

(30) Foreign Application Priority Data

May 21, 2010 (JP) .................................. 2010-117232

(51) Int. Cl.
*G01M 1/12* (2006.01)
*G01C 15/00* (2006.01)
(Continued)

(52) U.S. Cl.
CPC .............. *G01C 15/00* (2013.01); *B60T 8/172* (2013.01); *B60W 40/13* (2013.01); *G01M 1/10* (2013.01);
(Continued)

(58) Field of Classification Search
CPC ... G01M 1/22; G01M 17/007; B60G 2400/60; B60G 2400/91
See application file for complete search history.

(56) References Cited

U.S. PATENT DOCUMENTS 5,825,284 A * 10/1998 Dunwoody ........ B60G 17/0162
340/438
8,483,942 B2 * 7/2013 Watanabe ............. B60W 40/12
14/69.5
2009/0235724 A1 9/2009 Ryu et al.

FOREIGN PATENT DOCUMENTS

JP          64-9047      1/1989
JP       05-124543 A    5/1993
(Continued)

OTHER PUBLICATIONS

International Search Report for PCT/JP2011/002734, mailed Jul. 12, 2011.

*Primary Examiner* — Mischita Henson
*Assistant Examiner* — Christine Liao
(74) *Attorney, Agent, or Firm* — Marshall, Gerstein & Borun LLP

(57) ABSTRACT

A center-of-gravity detecting system includes a motion detector for detecting a vertical motion of a travelling object and a horizontal motion of the travelling object, and an arithmetic unit that calculates a center-of-gravity location of the travelling object using the frequency of a vertical motion of the travelling object, a frequency of the horizontal motion of the travelling object, a central angle of the horizontal motion of the travelling object, and the width of the traveling object. The arithmetic unit calculates a center-of-gravity location, using the frequency of the vertical motion, a frequency of the horizontal motion, the center-of-gravity location, and the length of the travelling object in the travel direction.

8 Claims, 13 Drawing Sheets

(51) Int. Cl.
*G01M 1/10* (2006.01)
*B60W 40/13* (2012.01)
*G06F 17/00* (2006.01)
*B60T 8/172* (2006.01)
*B60W 50/00* (2006.01)

(52) U.S. Cl.
CPC ............... *G01M 1/12* (2013.01); *G01M 1/122* (2013.01); *G06F 17/00* (2013.01); *B60W 2040/1315* (2013.01); *B60W 2050/0031* (2013.01); *B60W 2300/14* (2013.01); *B60W 2520/16* (2013.01); *B60W 2520/18* (2013.01); *B60Y 2200/147* (2013.01)

(56) References Cited

FOREIGN PATENT DOCUMENTS

| | | |
|---|---|---|
| JP | 05-213108 A | 8/1993 |
| JP | 11-304663 A | 11/1999 |
| JP | 2000-028427 A | 1/2000 |
| JP | 2000-302063 A | 10/2000 |
| JP | 2001-097072 A | 4/2001 |
| JP | 2005-313879 A | 11/2005 |
| WO | WO-2004/074804 A1 | 9/2004 |
| WO | WO-2008/062867 A1 | 5/2008 |
| WO | WO-2010/034580 A1 | 4/2010 |

\* cited by examiner

CENTER-OF-GRAVITY DETECTING SYSTEM

TECHNICAL FIELD

The present invention relates to a center-of-gravity detecting system capable of detecting a center-of-gravity location (hereinafter simply referred to as "three-dimensional center-of-gravity location" as desired) of a traveling object during travel in a three-dimensional space.

BACKGROUND ART

Highly accurate estimation of a three-dimensional center-of-gravity location of a traveling object during travel is advantageous in operation of the traveling object. For example, regarding a container transportation vehicle which transports container cargos imported and exported in international commercial trading, a three-dimensional center-of-gravity location of a container cargo vehicle provides valuable data that directly reflects biased loading of cargos in a container. Therefore, the accurate estimation of the three-dimensional center-of-gravity location can effectively prevent collapse/falling of cargo piles that may take place when a door of the container is opened and unstable traveling of the container transportation vehicle (e.g., unstable traveling on a curved road).

As used herein, the term "biased loading" of the cargos in the container means a deviation of a load point determined by the center-of-gravity of the container cargo in a space depending on a disposition state of the container cargo, and does not mean a deviation of a load point on a flat plane of a bottom surface of the container as generally understood in container transportation business.

There have been proposed a technique for measuring a loaded state of cargos in a vehicle such as a four-wheel truck or a loading abnormality of cargos (see e.g., Patent Literatures 1 to 7). However, in the Patent Literatures 1 to 7, importance of the three-dimensional center-of-gravity location of the traveling object during travel is not recognized. Therefore, consideration should not be given to the Patent Literatures 1 to 7 regarding deriving of the three-dimensional center-of-gravity location.

As a solution to this, the present inventors derived the three-dimensional center-of-gravity location of a vehicle which can be loaded with the cargos and is towed by a towing vehicle, based on a logical dynamic theory and reported this technique (see Patent Literature 8). This can address various social issues caused by the container transportation vehicle.

CITATION LISTS

Patent Literature

Patent Literature 1: Japanese Laid-Open Patent Application Publication No. 2005-313879

Patent Literature 2: Japanese Laid-Open Patent Application Publication No. 2000-28427

Patent Literature 3: Japanese Laid-Open Patent Application Publication No. 2000-302063

Patent Literature 4: Japanese Laid-Open Patent Application Publication No. Hei. 5-213108

Patent Literature 5: Japanese Laid-Open Patent Application Publication No. Hei. 5-124543

Patent Literature 6: Japanese Laid-Open Patent Application Publication No. 2001-97072

Patent Literature 7: Japanese Laid-Open Patent Application Publication No. Sho. 64-9047

Patent Literature 8: International Publication No. 2008/062867

SUMMARY OF THE PRESENT INVENTION

Technical Problem

In Patent Literature 8, an attention has paid to a fact that a widthwise substantial length of a container cargo vehicle is different between a coupler at a front portion of the container cargo vehicle and a rear cross beam of the container cargo vehicle, and a center-of-gravity location of the container cargo vehicle in its front-rear direction (traveling direction) is specified.

Specifically, when the container cargo vehicle is applied with external disturbances due to irregularities (unevenness) of a road surface, the container cargo vehicle is swung. Such a horizontal motion of the container cargo vehicle can be recognized as a rotational (circular) motion which is called a widthwise rolling (hereinafter simply referred to as "rolling") of the container cargo vehicle. A force for twisting the container cargo vehicle in its widthwise direction is greater when the external disturbances are applied to the front/rear portion of the container cargo vehicle than when the external disturbances are applied to a portion of the container cargo vehicle which is immediately below its center-of-gravity. As a result, when the external disturbances are applied to the front/rear portion of the container cargo vehicle, a rolling amplitude has a maximum peak. This physical phenomenon can be easily understood by presuming that since the front/rear portion of the container cargo vehicle is distant from the center-of-gravity location of the container cargo vehicle, a principle of leverage works effectively and a great widthwise rolling of the container cargo vehicle occurs.

In Patent Literature 8, it was theoretically derived that a rolling frequency of the container cargo vehicle depends on the widthwise substantial length of the container cargo vehicle in the course of formulation of center-of-gravity location of the container cargo vehicle in a travel direction.

As a result of the above, in a case where fast Fourier transform (FFT) is applied to time-series angular velocity data to convert data output from a motion detector attached on a tractor of the container cargo vehicle into rolling data representing a correlation between a rolling frequency and a rolling amplitude, a diameter of the coupler at the front portion of the container cargo vehicle is different in dimension from the length of the rear cross beam of the container cargo vehicle. Therefore, there are maximum peak amplitudes of the rolling motion corresponding to two different frequencies.

For example, FIG. 7 shows an example in which maximum peak amplitudes "P1", "P2" are present at two different frequencies, respectively. In other words, as shown in FIG. 7, there are a maximum peak amplitude "P1" of a rolling motion originating from a coupler 13 and a maximum peak amplitude "P2" of the rolling motion originating from a rear cross beam 21. In addition, there is a minimum peak amplitude "P3" (negative peak: bottom amplitude) of the rolling motion originating from a center-of-gravity W of the container cargo vehicle in the travel direction.

Therefore, in Patent Literature 8, it was concluded that the center-of-gravity location of the container cargo vehicle in the travel direction can be identified by using frequencies "$v_1$", "$v_2$" and "$v_g$" corresponding to the peak amplitudes "P1", "P2", and "P3", and hence the three-dimensional center-of-gravity location of the container cargo vehicle can be calculated (its detail will be discussed later).

However, in a case where a container transportation vehicle 50 is travelling on a smooth road surface, for example, newly paved road surface, an influence of the external disturbances applied to the container cargo vehicle which would swing its center-of-gravity diminishes. Especially, as the diameter of the coupler 13 is smaller, the influence of the external disturbances which would swing the container cargo vehicle diminishes more, and the frequency of the rolling originating from the coupler 13 shifts to a smaller one. That is, the frequency and amplitude of the peak of the amplitude of the rolling motion originating from the coupler 13 are reduced. This results in a phenomenon in which the maximum peak amplitude "P1" of the rolling motion originating from the coupler 13 cannot be observed easily and disappears in a worst case when the road surface is too smooth or the diameter of the coupler 13 is too small.

For example, FIG. 8 shows an example in which the maximum peak amplitude of the rolling motion originating from the coupler 13 has disappeared. FIG. 8 shows only the maximum peak amplitude "P2" of the rolling motion originating from the rear cross beam 21.

Therefore, under the circumstances, it becomes difficult to calculate the three-dimensional center-of-gravity location of the container cargo vehicle, by the center-of-gravity detecting system disclosed in Patent Literature 8.

In automobiles such as a truck, a bus and an passenger car having a vehicle width being constant in a travel direction, maximum peak amplitudes do not theoretically appear at different two frequencies. In this case, the three-dimensional center-of-gravity location of the automobiles cannot be calculated, by the center-of-gravity detecting system disclosed in Patent Literature 8.

As described above, the conventional center-of-gravity detecting system disclosed in Patent Literature 8 has a room for improvement in application of universal calculation of the three-dimensional center-of-gravity location of the travelling object.

The present invention has been developed under the above mentioned circumstances, and an object of the present invention is to provide a center-of-gravity detecting system capable of universally deriving the three-dimensional center-of-gravity location of the travelling object during travel as compared to a conventional center-of-gravity detecting system.

Solution to Problem

To solve the above mentioned problems, according to the present invention, there is provided a center-of-gravity detecting system comprising: a motion detector for detecting a vertical motion of a travelling object in a self-weight direction of the travelling object during travel, and a horizontal motion of the travelling object in a widthwise direction of the travelling object during travel; and an arithmetic unit; wherein the arithmetic unit obtains a frequency of the vertical motion of the travelling object in the self-weight direction and a frequency of the horizontal motion of the travelling object in the widthwise direction corresponding to a width of the traveling object, by using the motion detector; the arithmetic unit calculates a center-of-gravity location of the travelling object in the self-weight direction in a cross-section perpendicular to the travel direction and a center-of-gravity location of the travelling object in the widthwise direction in the cross-section perpendicular to the travel direction, using the frequency of the vertical motion in the self-weight direction, the frequency of the horizontal motion in the widthwise direction, a central angle of the horizontal motion in the widthwise direction, and the width of the traveling object; the arithmetic unit derives coefficients in a formula in which a relation between the width of the travelling object and the frequency of the horizontal motion in the widthwise direction is formulated, using the center-of-gravity location in the self-weight direction, the center-of-gravity in the widthwise direction, the frequency of the vertical motion in the self-weight direction, and the central angle of the horizontal motion in the widthwise direction; the arithmetic unit calculates a frequency of the horizontal motion in the travel direction using the coefficients in the formula in a case where the width of the travelling object is a length of the travelling object in the travel direction, in the formula; and the arithmetic unit calculates a center-of-gravity location of the travelling object in the travel direction, using the frequency of the vertical motion in the self-weight direction, a frequency of the horizontal motion in the travel direction, the center-of-gravity location in the self-weight direction, and the length of the travelling object in the travel direction.

The formula may be represented by a formulated formula (X), in which the width (b) of the travelling object is an independent variable and the frequency "v" of the horizontal motion of the travelling object in the widthwise direction is an dependent variable; and the arithmetic unit may calculate the frequency of the horizontal motion of the travelling object in the travel direction by assigning the length of the travelling object in the travel direction to the independent variable in the formula (X).

$$v^2 = Kb^2 + K_0 \tag{X}$$

wherein "K" contains as variables the center-of-gravity location in the self-weight direction, the center-of-gravity location in the widthwise direction, the vertical motion frequency in the self-weight direction, and the central angle of the horizontal motion in the widthwise direction; and "$K_0$" contains as variables the center-of-gravity location in the self-weight direction, the center-of-gravity location in the widthwise direction, and the central angle of the horizontal motion in the widthwise direction.

Thus, the present invention has a feature that the frequency of the horizontal motion of the travelling object in the travel direction is calculated by estimation. Apparently, such a frequency can be actually measured easily by the above motion detector.

So, an attempt was made to actually measure the peak amplitude of the frequency of the horizontal motion of the travelling object in the travel direction by using the above motion detector. However, the peak amplitude of the frequency could not be confirmed (detail will be descried in example later).

In operation of ship, it is known that a unique rotational motion (this motion is often called "pitching" in the field of ship) with a widthwise axis of the ship does not last for a long period of time and vanishes, because of the fact that the ship sinks and floats in a front-rear direction and pushes away water in great quantities, when the ship swings in the front-rear direction, and thereby an energy of the rotational motion is consumed.

The present inventors presumes that the same phenomenon as the above phenomenon occurring in the operation of the ship occurs in the horizontal motion of the travelling object in the travel direction. In view of this, the reason why the above peak amplitude cannot be confirmed can be understood easily.

This fact clearly supports usefulness of the estimation of the frequency.

With the above configuration, the center-of-gravity detecting system of the present invention can calculate the three-dimensional center-of-gravity location of the travelling object during travel, even when the road surface on which the travelling object travels is smooth. In addition, the center-of-gravity detecting system of the present invention can calculate the three-dimensional center-of-gravity location of the automobile having a vehicle width constant in the travel direction, such as a truck, a bus, or a passenger car.

Therefore, the center-of-gravity detecting system of the present invention is capable of universally deriving the three-dimensional center-of-gravity location of the travelling object during travel, as compared to the prior art detecting system.

In the center-of-gravity detecting system, the traveling object may be a container cargo vehicle towed by a towing vehicle.

By the way, the formulation of the motion of an object generally includes two methods: one is recognition as an issue of a dynamics of mass system; the other is recognition as an issue of the dynamics of rigid body system. The dynamics of rigid body system, however, is based on the theory that a distribution of mass is even in the rigid body. Therefore, it appears to be inappropriate that the motion of the traveling object comprised of various components having different sizes and shapes is recognized as the issue of the dynamics of rigid body system.

In view of the above, the present inventors found out that by categorizing the motion of the traveling object as the issue of the dynamics of the mass system in which the center-of-gravity of the traveling object is a mass point, the three-dimensional center-of-gravity location of the traveling object can be calculated properly.

In the center-of-gravity detecting system of the present invention, when the vertical motion in the self-weight direction corresponds to a vertical reciprocation motion in which a center-of-gravity of the traveling object is a mass point, and the horizontal motion in the widthwise direction corresponds to a horizontal simple pendulum motion in which an axle center of the traveling object in the width direction is a support point, and the center-of-gravity of the traveling object is a mass point, the arithmetic unit may convert output data of the motion detector into horizontal motion data that represents a correlation between a frequency and an amplitude of the simple pendulum motion, and obtains a frequency of the simple pendulum motion in correspondence with a peak amplitude of the simple pendulum motion which is derived from the width of the traveling object on the basis of the horizontal motion data, the arithmetic unit may further convert the output data of the motion detector into vertical motion data that represents a correlation between a frequency and an amplitude of the reciprocation motion, and obtains a frequency of the reciprocation motion corresponding to a maximum amplitude of the reciprocation motion on the basis of the vertical motion data, and the arithmetic unit may calculate the center-of-gravity location of the travelling object in the self-weight direction in the cross-section perpendicular to the travel direction and the center-of-gravity location of the travelling object in the widthwise direction in the cross-section perpendicular to the travel direction, using the width, the obtained frequency of the simple pendulum motion, the obtained frequency of the reciprocation, and a central angle of the simple pendulum motion.

In the center-of-gravity detecting system of the present invention, the vertical motion in the self-weight direction and the horizontal motion in the widthwise direction may be motions due to external disturbances applied to the traveling object during travel on a road surface, by irregularities of the road surface.

Thus, the center-of-gravity detecting system of the present invention can easily calculate the three-dimensional center-of-gravity location of the travelling object during travel, by causing the travelling object, for example, a truck, to travel according to a flow of cars in the vicinity of the truck.

The traveling condition of the road surface can be artificially made by, for example, rotation of a rotating roll provided with irregularities (unevenness).

In the center-of-gravity detecting system of the present invention, the motion detector may include an angular velocity sensor mounted on the traveling object, angular velocity sensitive axes of the angular velocity sensor being adjusted in the self-weight direction and in the widthwise direction.

Accordingly, the motion detector can be comprised of an inexpensive biaxial angular velocity sensor.

The object described above, other objects, features and advantages of the present invention will be disclosed from the preferred embodiments described below with reference to the attached drawings.

Advantageous Effects of the Present Invention

In accordance with the present invention, the center-of-gravity detecting system is capable of universally deriving the three-dimensional center-of-gravity location of the travelling object during travel, as compared to the prior art detecting system.

DESCRIPTION OF THE EMBODIMENTS

Figure 1:
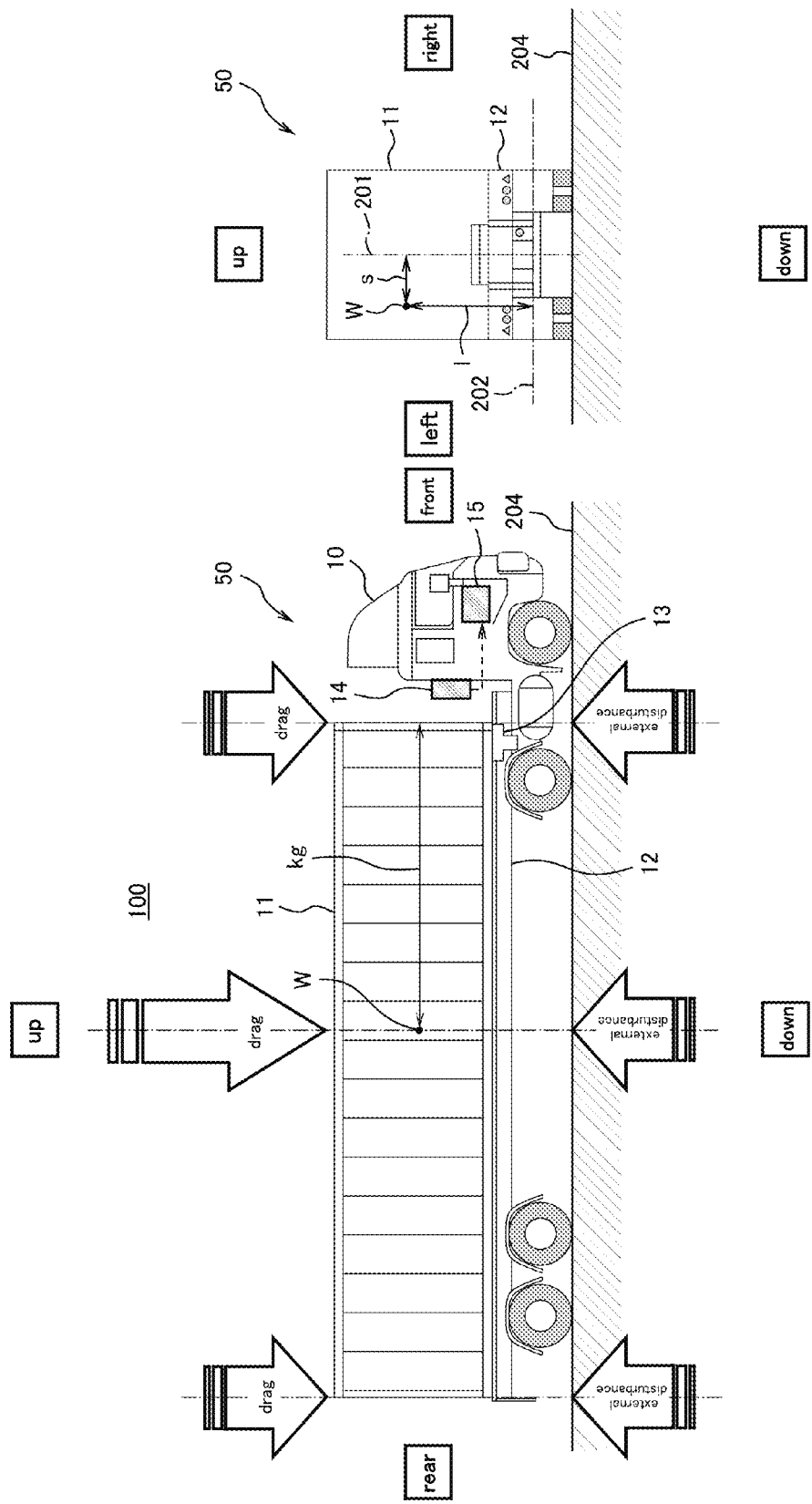
FIG. 1 is a schematic view showing an exemplary configuration of a center-of-gravity detecting system according to an embodiment of the present invention.

An embodiment of the present invention will be described below with reference to the drawings.

Throughout the drawings, the same reference numerals are assigned to the same or corresponding components, and the descriptions of the same or corresponding components are sometimes omitted.

The present invention is not limited to the embodiment below. The detailed description described below merely exemplifies the features of the center-of-gravity detecting system of the present invention. When a specifically exemplary system is described using specific wordings assigned with reference numerals, each of which corresponds to the corresponding component specifying the center-of-gravity detecting system of the present invention, such a system is merely an example of the components of the center-of-gravity detecting system of the present invention.

For example, the "container transportation vehicle (container cargo vehicle) 50" described below is merely an example of the "traveling object" that is a component of the system of the present invention.

Accordingly, the technology described in this specification can be applied to various transportation devices including trucks, busses, passenger cars, railway cars, ships and airplanes (for example, during landing and takeoff) in addition to the container transportation vehicles (container cargo vehicles). For example, the technology applied to the passenger car or railway car is described hereinafter as a modified example of the present invention.

In this specification, the "container cargo vehicle" refers to a portion of a container transportation vehicle 50 excluding a tractor 50 (towing vehicle), i.e., a vehicle including a container 11 capable of loading cargos and a container chassis 12 (carriage) for loading the container 11.

Embodiment

Exemplary Schematic Configuration of Center-of-Gravity Detecting System

FIG. 1 is a schematic view showing an exemplary configuration of a center-of-gravity detecting system according to an embodiment of the present invention. FIG. 1A is a view of the center-of-gravity detecting system viewed from a widthwise direction (lateral side) of the container cargo vehicle, whereas FIG. 1B is a view of the center-of-gravity detecting system viewed from a rear side of the container cargo vehicle.

Some of the drawings illustrate "UP" and "DOWN" to indicate the direction along which a self-weight of the container cargo vehicle is applied, "LEFT" and "RIGHT" to indicate a widthwise direction of the container cargo vehicle, and "FRONT" and "REAR" to indicate the travel direction of the container cargo vehicle. The description below sometimes uses "vertical (up/down) direction" instead of the "self-weight direction", "horizontal (left-right) direction" instead of the "widthwise direction", and "front-rear direction" instead of the "travel direction".

As illustrated in FIG. 1, the center-of-gravity detecting system 100 includes a container transportation vehicle 50, a motion detector 14, and an arithmetic unit 15. The motion detector 14 is capable of detecting the motion of the container cargo vehicle during travel, in the up/down direction (vertical direction) (self-weight direction), i.e., a vertical motion during travel, and the motion of the container cargo vehicle during travel, in the left-right (horizontal direction) (widthwise direction), i.e., a horizontal motion during travel. The motion detector 14 is thus configured to detect the motions in two directions (the self-weight direction and the widthwise direction in this case) that are orthogonal with each other and are included in a cross-section of the container cargo vehicle (the cross-section illustrated in FIG. 1B in this case).

Typical example of the container transportation vehicle 50 is a trailer truck that includes a tractor 10 as a towing vehicle. In this embodiment, therefore, trailer truck transportation is exemplified in which a tractor tows a container chassis loaded with a marine container of 40 feet (worldwide standard specification), and the configuration and operation of the container transportation vehicle 50 will be described below.

As illustrated in FIG. 1A, the trailer truck 50 includes a cuboid container 11 capable of loading container cargos (not shown), a container chassis 12 that loads the container 11 and is used as an carriage, and the tractor 10 (towing vehicle) coupled to the container chassis 12 to tow or drive the container chassis 12.

The tractor 10 includes a disc-shaped coupler 13 (coupling member) that couples the container chassis 12 to the tractor 10 such that the tractor 10 and the container chassis 12 can swing in the left-right (horizontal) direction via the coupler 13.

It should be noted that the detection technology by the center-of-gravity detecting system of the embodiment can be theoretically employed regardless of whether the container 11 is loaded with container cargos or unloaded with them. Accordingly, the container 11 in the specification includes both a container with cargos loaded thereon and a container without a cargo.

The configuration of the trailer truck 50 illustrated in FIG. 1 is merely an example, and thus the detection technology according to the embodiment of the present invention can be used for various types of trailer trucks.

Figure 2:
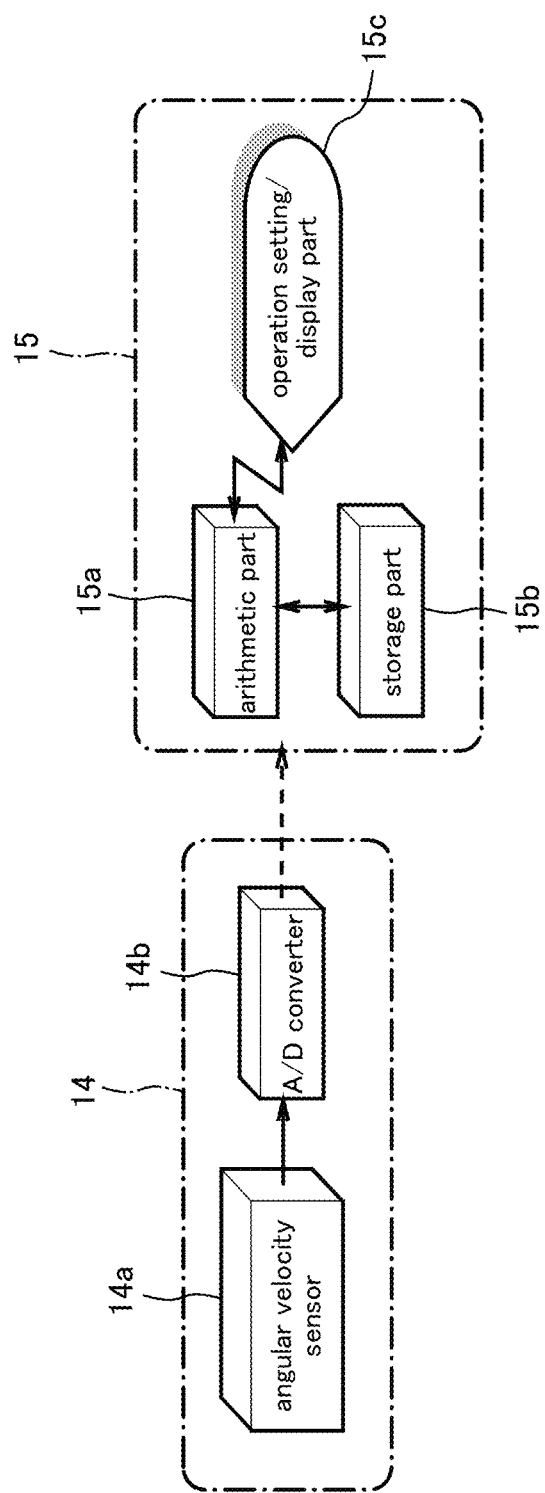
FIG. 2 is a block diagram showing an example of internal configurations of a motion detector and an arithmetic unit that are included in the center-of-gravity detecting system according to the embodiment of the present invention.

FIG. 2 is a block diagram showing an example of the internal configurations of the motion detector and the arithmetic unit in the center-of-gravity detecting system of the present embodiment.

The motion detector 14 is attached to the center of the trailer truck 50 in the left-right direction at the side of the tractor 10 and a location that does not disadvantageously affect a transportation operation (e.g., near the coupler 13). The arithmetic unit 15 is disposed in a desired location in a cabin of the tractor 10. The motion detector 14 and the arithmetic unit 15 are connected together via cable communication or radio communication through data input/output ports (not shown) so that data is transmitted between them.

As illustrated in FIG. 2, the motion detector 14 includes a biaxial (two-dimensional) angular velocity sensor 14a having angular velocity sensitive axes that are adjusted, to detect the motions of the container cargo vehicle in the up/down direction and in the widthwise direction, during travel of the trailer truck 50, and an A/D converter (analog/digital converter) 14b which converts an analog signal outputted from the angular velocity sensor 14a into a digital signal.

The volume of the angular velocity signal digitalized by the A/D converter 14b is proportional to an angular velocity of the motion of the container cargo vehicle in the up/down direction or in the widthwise direction during travel of the trailer truck 50. The biaxial angular velocity sensor 14a may be, for example, a crystal tuning fork sensor or a vibration sensor. Note that the angular velocity sensor 14a may be replaced by a three-axis (three-dimensional) angular velocity sensor.

Although, the exemplary motion detector 14 in this embodiment contains the A/D converter 14b therein to utilize the motion detector 14 conveniently, this A/D converter 14b can be installed outside the motion detector 14. In addition, the motion detector 14 contains various signal processing circuits including filters and amplifiers (which are not shown). Those circuits are commonly used, and will not be described in detail As illustrated in FIG. 2, the arithmetic unit 15 includes an arithmetic part 15a comprised of a microprocessor, a storage part 15b comprised of ROM (read-only memory), RAM (random-access memory), etc., and an operation setting/display part 15c. Examples of the arithmetic unit 15 include a personal digital assistant such as a notebook type personal computer.

The storage part 15b is connected to the arithmetic part 15a, and stores a calculation program to properly derive the three-dimensional center-of-gravity of the container cargo vehicle during travel and constants to be input (which will be described later) to be used in the calculation.

The arithmetic part 15a operates according to the calculation program prestored in the storage part 15b, and derives the center-of-gravity of the container cargo vehicle during travel on the basis of the digital signal outputted from the motion detector 14 (the A/D converter 14b), as will be described later.

The operation setting/display part 15c includes an operation part (e.g., a key board (not shown)) having setting buttons thereon for inputting the constants, and an informing device such as a liquid crystal panel screen and a speaker (which are not shown). The informing device provides the output data of the center-of-gravity of the container cargo vehicle during travel which is output from the arithmetic part 15a to an operator (driver or passenger) by means of visual information or sound information so that the operator can check it.

Next, the method of deriving the three-dimensional center-of-gravity location of the container cargo vehicle will be described with reference to the drawings.

Motion Model

Figure 3:
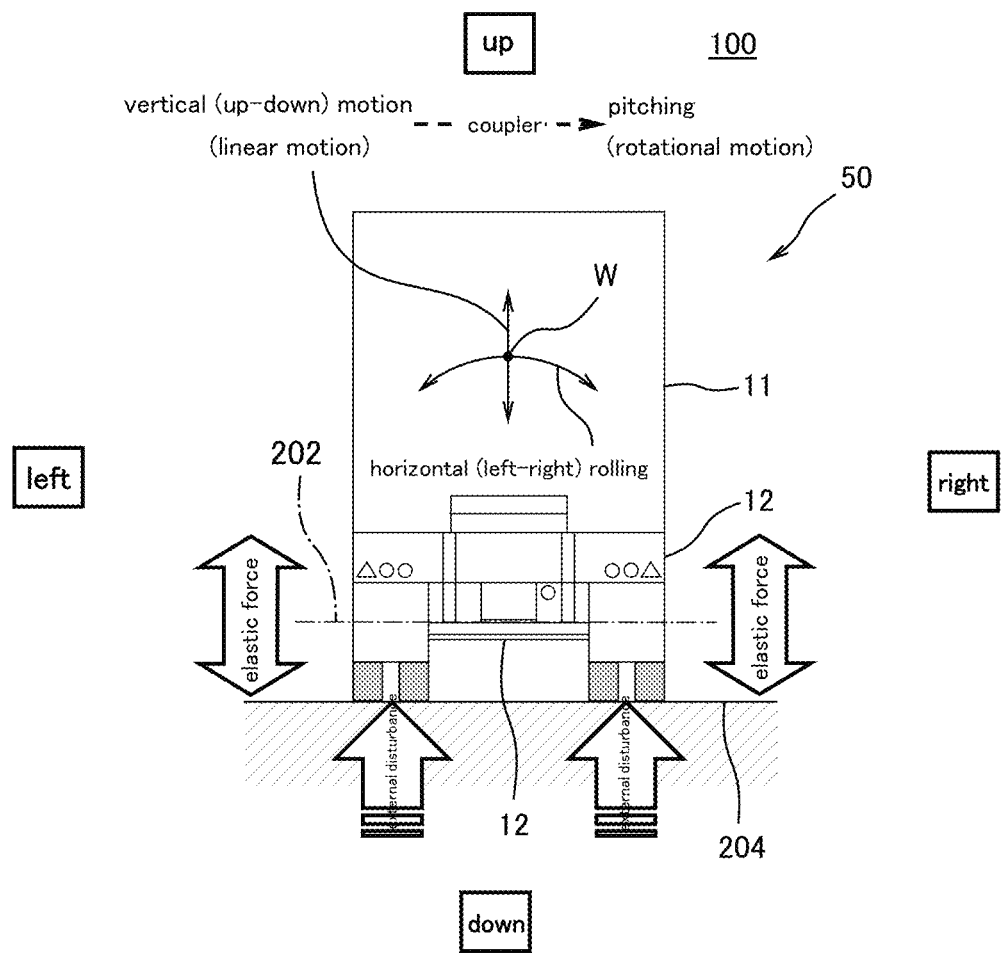
FIG. 3 is a schematic view that describes a method of deriving a center-of-gravity location of a container cargo vehicle of FIG. 1 during travel, the center-of-gravity location being in a cross-section perpendicular to the travel direction.
Figure 4:
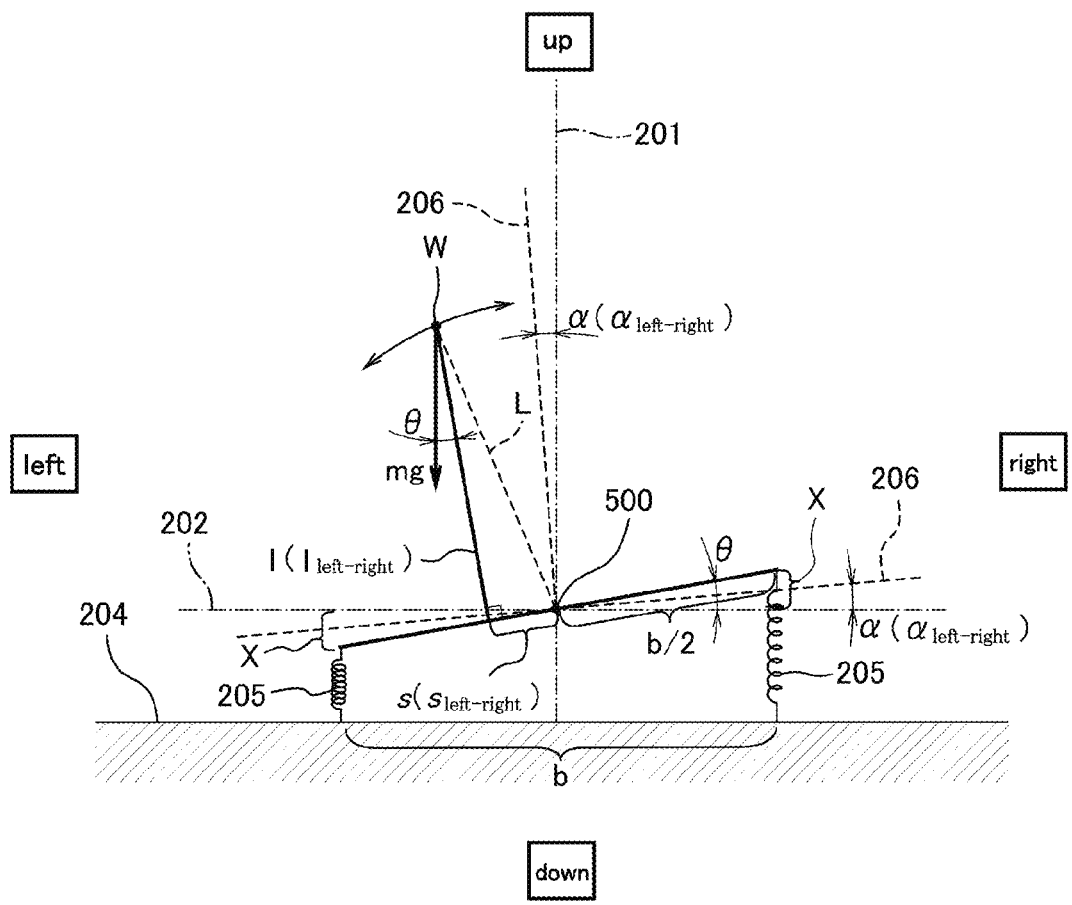
FIG. 4 is a schematic view that describes the method of deriving the center-of-gravity location of the container cargo vehicle of FIG. 1 during travel, the center-of-gravity location being in the cross-section perpendicular to the travel direction.
Figure 5:
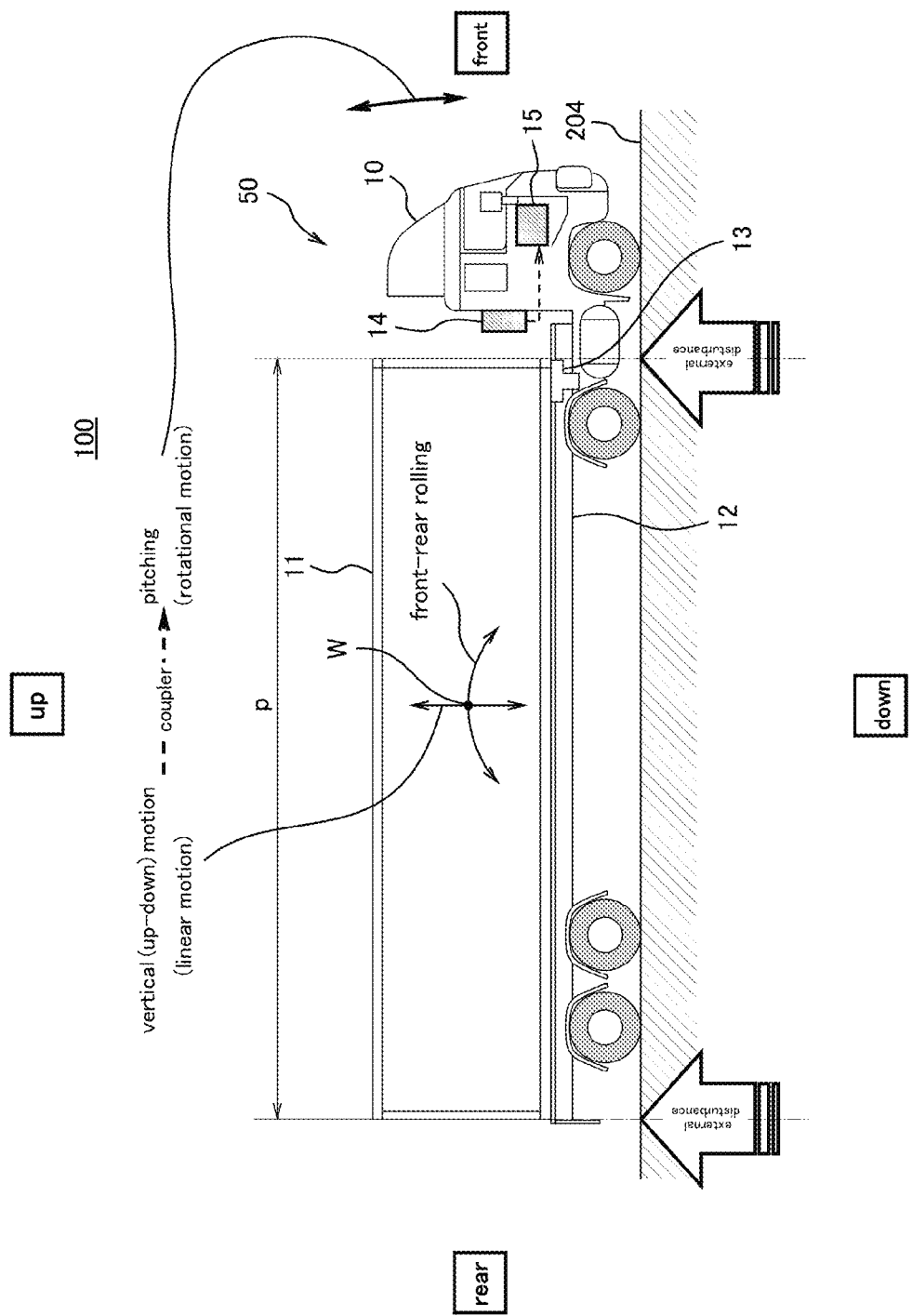
FIG. 5 is a schematic view that describes a method of deriving a center-of-gravity location of the container cargo vehicle of FIG. 1 during travel, the center-of-gravity location being in the travel direction.
Figure 6:
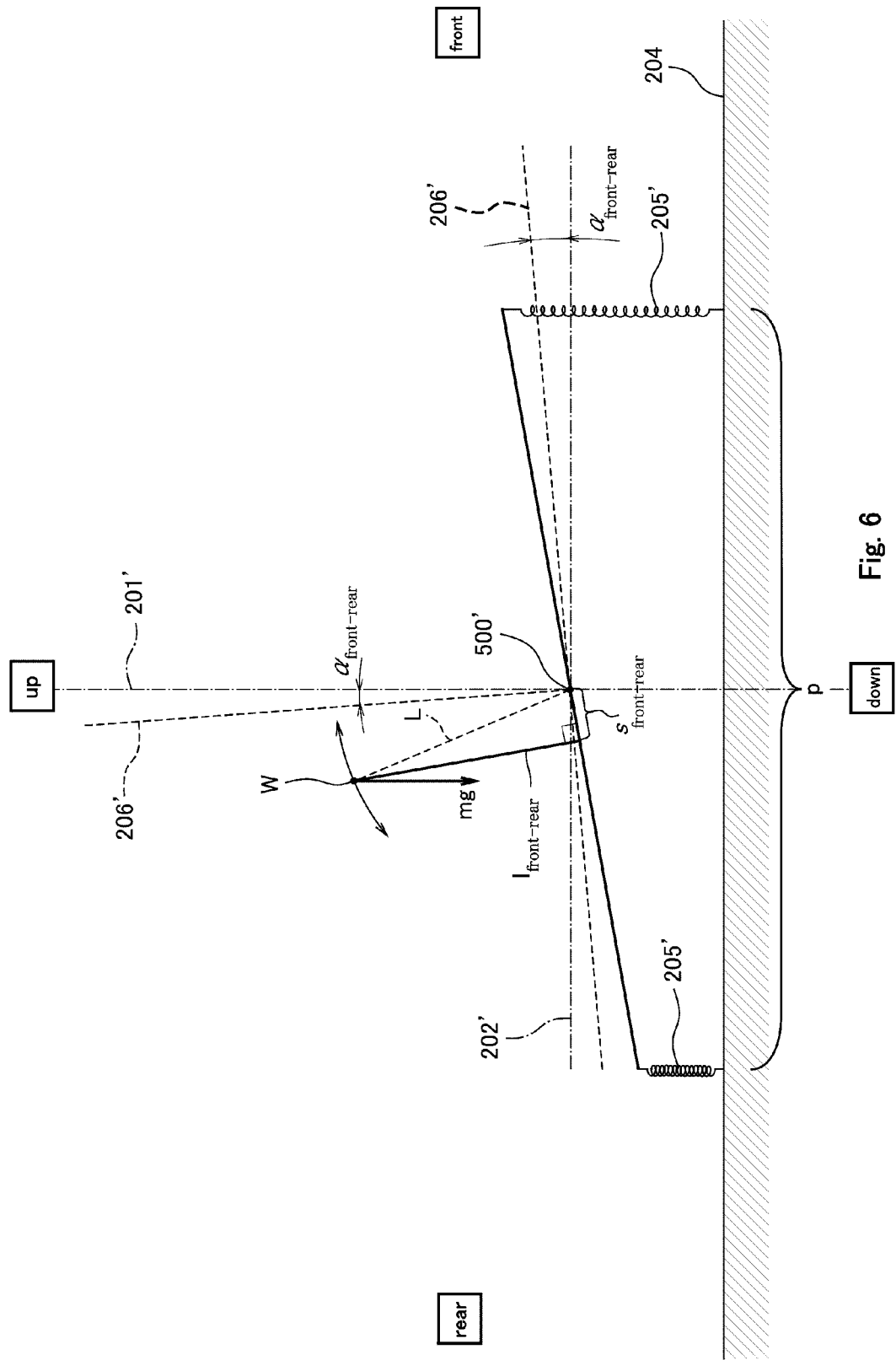
FIG. 6 is a schematic view that describes the method of deriving the center-of-gravity location of the container cargo vehicle of FIG. 1 during travel, the center-of-gravity location being in the travel direction.

FIGS. 3 and 4 are schematic views that describe the method of deriving the center-of-gravity location of the container cargo vehicle of FIG. 1 during travel, the center-of-gravity location being in the cross-section perpendicular to the travel direction. FIGS. 5 and 6 are schematic views that describe a method of deriving the center-of-gravity location of the container cargo vehicle of FIG. 1 during travel, the center-of-gravity location being in the travel direction.

The configuration of the center-of-gravity detecting system 100 illustrated in FIGS. 3, 4, 5 and 6 (the same in FIGS. 7, 8) are simplified or abbreviated so that the method of deriving the three-dimensional center-of-gravity location of the container cargo vehicle during travel can be understood easily.

In FIG. 6, the same components as those of FIG. 4 are assigned with the same reference symbols affixed with dash marks. In some cases, they will not be described regarding <Motion model> herein and <formulation> as described later.

As shown in FIG. 3, in a state in which the container 11 is placed on the container chassis 12, the container 11 is supported by a buffer elastic force (for example, air pressure and spring force) of suspensions 205 (suspension devices; see FIG. 4) disposed in the tractor 10 and the container chassis 12, and is in a neutral position at a constant level of height from a road surface 204. When the trailer truck 50 travels in this state, its tires will keep "treading" on irregularities of the road surface 204, and, as a result, random external disturbances will be transmitted via the suspensions 205 to a vehicle body (container 11) of the trailer truck 50. By such external disturbances, the trailer truck 50 oscillates (natural oscillation) based upon the motion having a characteristic period (frequency) dependent on an elastic force of the suspensions 205, a total weight of the container cargo vehicle, and its center-of-gravity location. This motion is detected by the motion detector 14 as a vertical reciprocation motion (e.g., simple oscillation) of the center-of-gravity W of the container cargo vehicle, and as a horizontal simple pendulum motion of the center-of-gravity W of the container cargo vehicle.

The suspension 205 in this specification refers to a member that can buffer a vibration of the vehicle body of the trailer truck 50 generated on the road surface 204, and includes, for example, a tire filled with the air and disposed at the ends of an axle in addition to a spring bumper coupled to the axle.

The former reciprocation motion (simple oscillation) corresponds to a behavior that is called a "pitching" of the tractor 10. When the container cargo vehicle reciprocates (linearly moves) in the up/down (vertical) direction, the coupler 13 by which the tractor 10 and the container chassis 12 are coupled together, is pushed vertically. Since the coupler 13 resides behind the tractor 10, the front portion of the tractor 10 conversely sinks and floats by the coupler 13 being pushed vertically. This phenomenon is the pitching (rotational motion) of the tractor 10. That is to say, the vertical reciprocation motion of the container cargo vehicle is transmitted through the coupler 13 to the tractor 10, thereby causing the tractor 10 to undergo pitching. The motion detector 14 detects the pitching of FIG. 3.

In addition, the latter simple pendulum motion corresponds to a behavior that is called a "rolling" of the trailer truck 50 around a front-rear axis of the trailer truck 50. The motion detector 14 detects the rolling of FIG. 3.

In the trailer truck 50, in addition to the pitching occurring in association with the vertical simple oscillation of the container cargo vehicle, there is a unique rotational motion (horizontal motion) with a left-right axis of the trailer truck 50 as shown in FIG. 5. In many cases, such a motion is called, for example, "pitching" in operation of ship. Therefore, to make difference from the "pitching" in the specification, the horizontal motion of FIG. 5 will be referred to as "rolling in the front-rear direction (travel direction)", while the horizontal motion of FIG. 3 will be referred to as "rolling in the left-right direction (widthwise direction)"

In the trailer truck 50, usually, each of the front, rear, right, and left axles is provided with a respective suspension 205; however, from the fact that behaviours of vertical reciprocation motion and horizontal simple pendulum motion occur at the same time, it can be considered reasonable that, in taking account into the dynamic elastic coefficient (spring constant), the analysis of the behaviours is conducted by simply assuming that a single elastic body (spring) is mounted on each of the right and left axles.

In addition, as an additional remark to the above, of the aforesaid prior art techniques, there is an example (Patent Literature 2) in which a characteristic quantity, such as the moment of inertia of a vehicle, is decided on the assumption of measuring the elastic coefficient of a suspension, and there is another example (Patent Literature 6) that makes, in advance, a database of the strengths of suspensions at the time of test runs. However, these techniques are of no utility for the trailer truck 50, when considering the actual conditions of container transport operations.

That is to say, the elastic coefficient of the suspension 205 varies depending on the manufacturers of the tractor 10 and the container chassis 12, a type of vehicle, a model year, and a degree of aging. Thus, it is practically impossible to specify the manufactures, the vehicle type, the model year, and the degree of aging, in view of actual conditions of the transport operation of the container 11. In the container transport operation, containers (container 11) are daily transported by trailer trucks (the trailer truck 50) composed of any combinations (practically speaking, numberless combinations) of an indefinite number of tractors (the tractor 10) and an indefinite number of container chassis (the container chassis 12). Consequently, there are no effective ways of how to pre-specify their manufacturer, type of vehicle, model year, not to mention that it is impossible to specify the degree of aging of both of the vehicles. Furthermore, from the fact that, as in the tractor 10, most types of tractors employ air suspensions, there are cases in which the elastic coefficient of each suspension 205 disposed on a respective axle varies from time to time depending on the loading condition of the container 11 placed on the container chassis 12 to be towed, the condition of the road surface 204, and the travel situation.

In addition, of the aforesaid prior art techniques, there is a technique (for example, Patent Literature 1) on the assumption that a large number of detectors are disposed in a chassis on the side of a container (which corresponds to the container chassis in the present specification); however, as can be easily imagined from the fact that the numeric quantity of container chassis dealt with in the container transport operation is huge, there is no way that this means is practical in view of the costs.

Formulation

Accordingly, when the center-of-gravity W of the container cargo vehicle is designated as a mass point, in view of the motion model of the center-of-gravity W as described above, the location of the center-of-gravity W of the container cargo vehicle in the cross-section perpendicular to the front-rear direction (travel direction) of the container 11 can be formulated as follows.

The method of the formulation of the following formulas (1) to (10) follows the method described in Patent Literature 8 that has been filed by the applicant of this application.

First, the center-of-gravity W of the container cargo vehicle is designated as a mass point, and a period "T'" (period corresponding to a pitching period of the tractor 10) of the vertical reciprocation motion of the center-of-gravity W of the container cargo vehicle is formulated.

As illustrated in FIG. 3, if it is thought that there are elastic forces of two elastic bodies at right and left sides of the vehicle, then the characteristic period of the reciprocation motion of the container cargo vehicle is expressed by the following formula.

$$T' = 2\pi\sqrt{\frac{m}{2k}}$$

In this formula, "T'" is a period of the vertical reciprocation motion of the center-of-gravity "W" of the container cargo vehicle. "k" is the elastic coefficient (spring constant) of one of the right and left suspensions 205. "m" is the weight of the container cargo vehicle, and "π" is a circle ratio.

Next, the period T of the horizontal (left-right) simple pendulum motion of the center-of-gravity W of the container cargo vehicle (rolling period of the trailer truck 50) is expressed in a formula where the center-of-gravity W of the container cargo vehicle is a mass point.

As shown in FIG. 4, since the rolling of the container cargo vehicle is the horizontal (left-right) simple pendulum motion of the center-of-gravity W of the container cargo vehicle in which an axle center 500 (intersection of a vertical central line 201 and an axle position line 202 as shown in FIG. 4) is a point of support, the following formula is obtained from the balance of rotational moment of a rolling circle in a tangential direction during rolling of the container cargo vehicle.

$$Lf = -kx\frac{b}{2} + mgl \sin\theta + mgs \cos\theta - kx\frac{b}{2}$$
$$= -kxb + mgl \sin\theta + mgs \cos\theta$$

In this formula, "f" is a force that is imparted in the tangential direction of the rolling circle (rotating circle) to the center-of-gravity W of the container cargo vehicle. "θ" is a "rolling angle". "L" is a length from the axle center 500 to the center-of-gravity W of the container cargo vehicle. "b" is a length of a portion that supports the load of the container 11, and is the constant decided for each container 11. "l" is a vertical length from the axle to the center-of-gravity W of the container cargo vehicle, and is a value that represents a vertical location of the center-of-gravity W of the container cargo vehicle, in the cross-section perpendicular to the front-rear direction of the container 11, as shown in FIG. 1B. "s" is a horizontal length from the axle center 500 to the center-of-gravity W of the container cargo vehicle, and is a value that represents a horizontal location of the center-of-gravity W of the container cargo vehicle, in the cross-section perpendicular to the front-rear direction of the container 11, as shown in FIG. 1B. "x" is the amount of displacement of each of the right and left suspensions. "g" is gravitational acceleration.

That is, "l" indicates a location of the center-of-gravity W of the container cargo vehicle in the cross-section perpendicular to the front-rear direction (travel direction) of the container 11, more particularly, location of the center-of-gravity W of the container cargo vehicle in its self-weight direction. "s" indicates a location of the center-of-gravity W of the container cargo vehicle in the cross-section perpendicular to the front-rear direction (travel direction) of the container 11, more particularly, location of the center-of-gravity W of the container cargo vehicle in its widthwise direction.

Here, since x=(b/2) sin θ, then the aforesaid rotational moment's balance formula can be represented as follows by formula (1).

$$Lf = -k\frac{b^2}{2}\sin\theta + mgl\sin\theta + mgs\cos\theta \quad (1)$$
$$= -mg\left(\frac{kb^2}{2mg}\sin\theta - l\sin\theta - s\cos\theta\right)$$
$$= -mg\left\{\left(\frac{kb^2}{2mg} - l\right)\sin\theta - s\cos\theta\right\}$$

In addition, formula (1) is expanded as given in formula (2) by the composition of trigonometric functions in parenthesis. In formula (2), the angle of the sine function (θ+α) obtained by the trigonometric function composition is represented as the rolling angle θ'.

$$Lf = -mg\sqrt{\left(\frac{kb^2}{2mg} - l\right)^2 + (-s)^2}\sin\theta' \quad (2)$$
$$\tan\alpha = \frac{-s}{\frac{kb^2}{2mg} - l}$$
$$\therefore f = -\frac{mg}{L}\sqrt{\left(\frac{kb^2}{2mg} - l\right)^2 + (-s)^2}\sin\theta'$$

Now, if the horizontal location of the center-of-gravity W of the container cargo vehicle resides on the vertical central line 201, then the central angle α of the rolling (simple pendulum motion) of the center-of-gravity W becomes zero. In the present specification, the central angle α indicates the angle formed by the vertical central line 201 and a rolling central line 206, as shown in FIG. 4.

On the other hand, if the aforesaid location is deviated either rightward or leftward (that is, s≠0), then the central angle α of the rolling has a constant value other than zero. If, in this condition, the trailer truck 50 is brought to a stop, it tilts and neutralises while the central angle α is maintained. Therefore, by replacing θ in formula (1) with the central angle α of the rolling of the center-of-gravity W (in other words, the angle of inclination of the center-of-gravity W during stop), this makes the following formula (3) true on the assumption of either the case where the center-of-gravity W passes through the center of the rolling or the case where the trailer truck 50 stops.

$$Lf = 0 \quad (3)$$
$$0 = \left(\frac{kb^2}{2mg} - l\right)\sin\alpha - s\cos\alpha$$
$$\therefore s = \left(\frac{kb^2}{2mg} - l\right)\tan\alpha$$

The central angle "α" of the rolling of the center-of-gravity W of the container cargo vehicle corresponds to the inclination angle of the container cargo vehicle during travel. Therefore, hereinafter, the central angle "α" is sometimes referred to as an inclination angle "α" of the container cargo vehicle during travel.

Therefore, if substituted in formula (2) for reorganization, formula (3) becomes the following formula.

$$f = -\frac{mg}{L}\sqrt{\left(\frac{kb^2}{2mg} - l\right)^2 + \left\{\left(\frac{kb^2}{2mg} - l\right)\tan\alpha\right\}^2}\sin\theta'$$
$$= -\frac{mg}{L}\left(\frac{kb^2}{2mg} - l\right)\sqrt{1 + \tan^2\alpha}\sin\theta'$$
$$= -\frac{mg}{L}\left(\frac{kb^2}{2mg} - l\right)\sqrt{\frac{\cos^2\alpha + \sin^2\alpha}{\cos^2\alpha}}\sin\theta'$$
$$= -\frac{mg}{L}\left(\frac{kb^2}{2mg} - l\right)\frac{1}{\cos\alpha}\sin\theta'$$
$$= -\frac{1}{L\cos\alpha}\left(\frac{kb^2}{2} - mgl\right)\sin\theta'$$

Actually, it is assumed that the aforesaid rolling angle θ' is a very small value of a few of degrees of angle at most. Therefore, "f" in the formula can be written as given in the following formula from the characteristics of the trigonometric function when "θ'" has a low enough value (that is, from the relationship of sin θ'≈θ').

$$\therefore f = -\frac{1}{L\cos\alpha}\left(\frac{kb^2}{2} - mgl\right)\theta'$$

This formula form, since it is equivalent to the equation of the circulation motion of a pendulum where L is the radius, is rewritten as follows.

$$mL\frac{d^2\theta'}{dt^2} = -\frac{1}{L\cos\alpha}\left(\frac{kb^2}{2} - mgl\right)\theta'$$
$$\frac{d^2\theta'}{dt^2} = -\frac{1}{L^2\cos\alpha}\left(\frac{kb^2}{2m} - gl\right)\theta'$$

Here, if an angular velocity (frequency) of "θ'" is "ω", it follows that:

$$\frac{d^2\theta'}{dt^2} = -\omega^2\theta'$$

$$\therefore \omega = \frac{1}{L\sqrt{\cos\alpha}}\sqrt{\frac{kb^2}{2m} - gl}$$

In addition, the rolling period of the trailer truck 50 is T, and since T=2π/ω, the following rewriting is obtained.

$$T = \frac{2\pi}{\frac{1}{L\sqrt{\cos\alpha}}\sqrt{\frac{kb^2}{2m} - gl}}$$

And, since $L=\sqrt{(l^2+s^2)}$, the following formula is finally obtained for the rolling period "T".

$$\therefore T = \frac{2\pi\sqrt{(l^2+s^2)\cos\alpha}}{\sqrt{\frac{kb^2}{2m} - gl}}$$

In this way, "T'" (the period of the vertical reciprocation motion of the center-of-gravity W of the container cargo vehicle) and "T" (the period of the horizontal simple pendulum motion of the center-of-gravity W of the container cargo vehicle) are derived.

Incidentally, the angular velocity detected by the motion detector 14 (the angular velocity sensor 14a) is generally the angular frequency (hereinafter abbreviated as the "frequency") that corresponds to the angle/time, and this frequency is represented by the reciprocal of the period (1/period). Therefore, if the pitching frequency of the tractor 10 that corresponds to "T'" (the period of the vertical reciprocation motion of the center-of-gravity W) is denoted as "v'" and, in addition, the rolling frequency thereof that corresponds to "T" (the period of the horizontal simple pendulum motion of the center-of-gravity W) is denoted as "v", then the aforesaid formulas can be reorganized to the following formulas, respectively.

$$v' = \frac{1}{T'} \tag{4}$$

$$= \frac{1}{2\pi}\sqrt{\frac{2k}{m}}$$

$$v = \frac{1}{T} \tag{5}$$

$$= \frac{\sqrt{\frac{kb^2}{2m} - gl}}{2\pi\sqrt{(l^2+s^2)\cos\alpha}}$$

Here, as can be understood from comparison between formulas (3), (4), and (5), if the frequency "v", and the frequency "v'" are known values (in other words, in the case where the arithmetic unit 15 succeeds in specifying these values, "v", and "v'" by using the aid of the motion detector 14), the number of unknown values is three, namely, "l", "s", and "α". The method of deriving the inclination angle "α" will be described later.

Accordingly, the numerical values "l" and "s" representing the location of the center-of-gravity W of the container cargo vehicle in a cross-section perpendicular to the front-rear direction (travel direction) of the container 11 in relation to the inclination angle "α" of the container cargo vehicle during travel are formulated as follows. Thus, formulas (4) and (5) are developed to formulas (6) and (7), respectively.

$$\frac{k}{m} = 2\pi^2 v'^2 \tag{6}$$

$$2\pi v\sqrt{(l^2+s^2)\cos\alpha} = \sqrt{\frac{kb^2}{2m} - gl} \tag{7}$$

$$4\pi^2 v^2(l^2+s^2)\cos\alpha = \frac{kb^2}{2m} - gl$$

If formula (6) is substituted in formula (7), formula (8) results.

$$4\pi^2 v^2(l^2+s^2)\cos\alpha = b^2\pi^2 v'^2 - gl \tag{8}$$

$$\therefore l^2 + s^2 = \frac{b^2\pi^2 v'^2 - gl}{4\pi^2 v^2\cos\alpha}$$

Similarly, if formula (6) is substituted in formula (3), formula (9) results.

$$\therefore s = \left(\frac{\pi^2 v'^2 b^2}{g} - l\right)\tan\alpha \tag{9}$$

In addition, here, if formula (9) is substituted in formula (8) to write a quadratic equation by "l", this provides a rewrite as given in the following formula (10).

$$(1+\tan^2\alpha)l^2 + \left(\frac{g}{4\pi^2 v^2\cos\alpha} - \frac{2\pi^2 v'^2 b^2}{g}\tan^2\alpha\right)l + \frac{\pi^4 v'^4 b^4}{g^2}\tan^2\alpha - \frac{b^2 v'^2}{4v^2\cos\alpha} = 0 \tag{10}$$

Here, if the secondary coefficient, the primary coefficient, and the constant term of "l" are specified, "l" is found, and if it is substituted in formula (9), "s" is also found.

In this way, formula (8), formula (9) and formula (10) prove that it leads to the question of a simple simultaneous equation in which only "l" and "s" (the values each representing the location of the center-of-gravity W of the container cargo vehicle, in the cross-section perpendicular to the front-rear direction of the container 11), are unknown when inclination angle "α" is determined.

In this simultaneous equation, internalization is made such that "k" (the elastic coefficient of the suspension 205) and "m" (the weight of the container cargo vehicle) are not input values. That is to say, "k" (the elastic coefficient of the suspension 205) and "m" (the weight of the container cargo vehicle) are removed, in the process of formulating the above-described simultaneous equation, from these formulas. And, this makes it possible to save thousands of man-hours taken for measuring the elastic coefficient "k" and the weight "m" and its significance is extremely great when contemplating the situation that containers 11 are daily transported by trailer trucks 50 composed of any combinations of an indefinite number of tractors 10 and an indefinite number of container chassis 12.

Next, description will be given of the method of deriving the location of the center-of-gravity W of the container cargo vehicle in the travel direction, (in the front-rear direction of the container 11).

As described above, the location of the center-of-gravity W of the container cargo vehicle, which is in the cross-section perpendicular to the travel direction of container cargo vehicle can be derived by solving the simultaneous equation of formulas (9) and (10) for "l" and "s": however, the three-dimensional center-of-gravity location of the container cargo vehicle still remains unspecified. That is, in addition to these values "l" and "s", it is required that the location of the center-of-gravity W of the container cargo vehicle in the travel direction be found.

The location of the center-of-gravity W of the container cargo vehicle in the travel direction can be derived by the following two methods.

First Method

Figure 7:
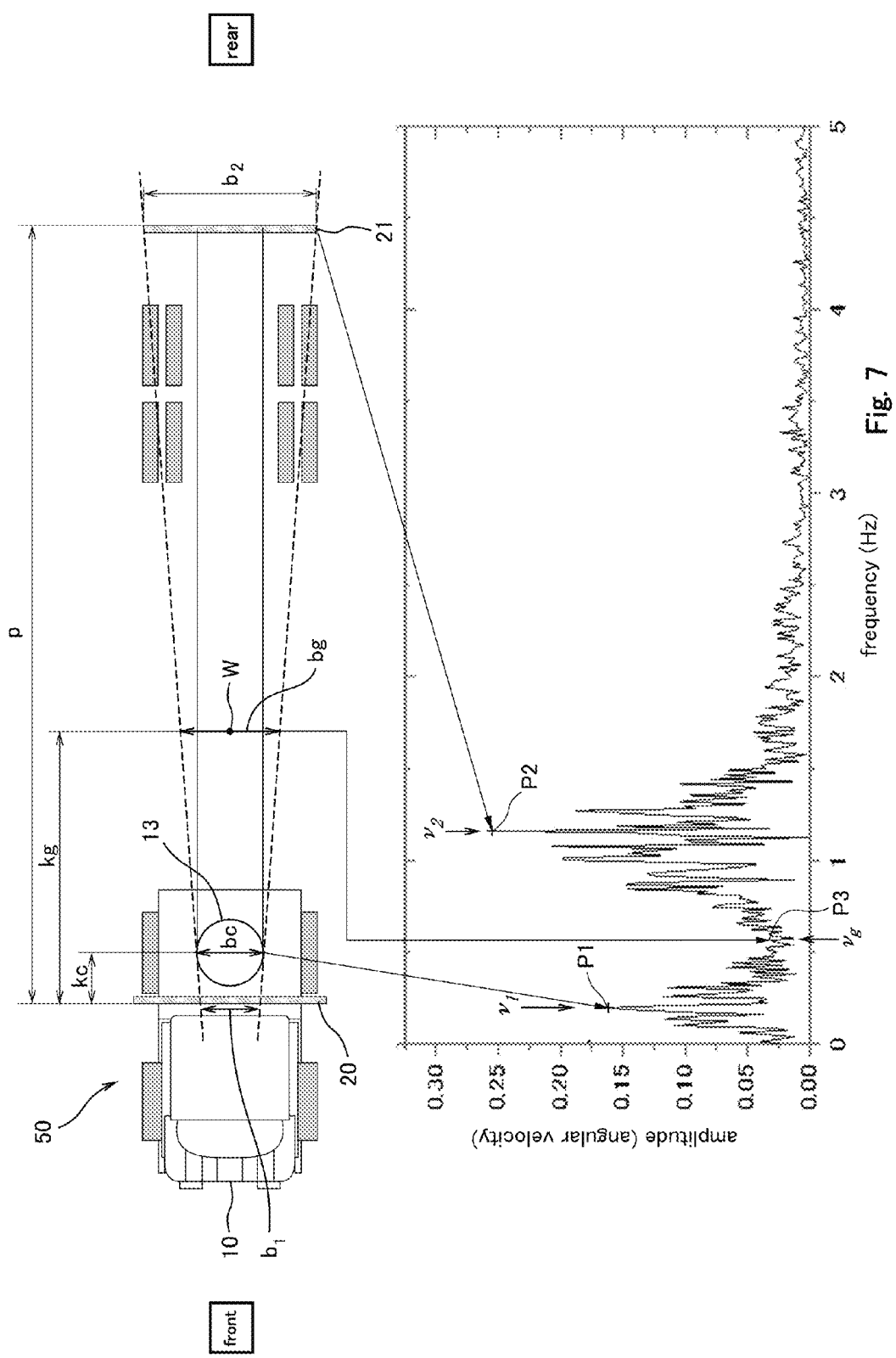
FIG. 7 is a schematic view showing an example in which maximum peak amplitudes are present at two different frequencies, respectively.

In the case where maximum peak amplitudes of the rolling motion appear at different two frequencies as shown in FIG. 7, the location of the center-of-gravity W of the container cargo vehicle in the front-rear direction can be formulated as follows, according to the methods disclosed in Patent Literature 8.

As shown in FIG. 7, in the trailer truck 50, the container 11 placed on the container chassis 12 is supported by rear and front cross beams 21 and 20 of the container chassis 12. These front and rear cross beams 20 and 21 extend in the horizontal direction (widthwise direction) of the container 11, and are firmly secured to longitudinal beams (not shown) extending in the front-rear direction. As a result of this arrangement, the load of the container 11 is dispersed, through the rear and front cross beams 21 and 20 and the longitudinal beams, to the tractor 10 coupled to the front portion of the container chassis 12 and to the suspensions 205 in the rear portion of the container chassis 12.

Now, in the trailer truck 50 in motion while carrying the container 11, in the center of action, in the front-rear direction, of external disturbances caused by irregularities of the road surface 204, the strengths (amplitude) of rolling resulting from the external disturbances differs, as shown in FIG. 1A. For example, as shown in FIG. 1A, if the center of action of the external disturbance is away from the center-of-gravity location, the load of the trailer truck 50 against the external disturbance diminishes and, as a result, the rolling amplitude increases. Conversely, if the center of action of the external disturbances is closer to the center-of-gravity location, the great load of the trailer truck 50 functions as a drag and, as a result, the rolling amplitude diminishes. Therefore, since the location of the center-of-gravity W in the front-rear direction resides between the front cross beam 20 and the rear cross beam 21, the center of action of the external disturbance, where the phenomenon of rolling significantly appears in the direction in which the roiling amplitude increases, is the positions of the front and rear cross beams 20 and 21 of the container chassis 12 corresponding to the front and rear portions of the container 11, respectively.

Here, the front portion of the container chassis 12 and the tractor 10 are coupled together by a disc-shaped coupling member called the coupler 13 and having a shorter length than a front cross beam 20 of the container chassis 12. The diameter of the coupler 13 is usually less than half the length of the front cross beam 20 of the container chassis. Therefore, the horizontal length of a support of the portion that connects the tractor 10 to the container chassis 12 carrying the container 11 is not the length of the front cross beam 20 of the container chassis 12 but is the diameter $b_c$ of the coupler 13.

If, in this condition, formula (5) is taken into consideration, the rolling frequency "v" depends upon the values "l" and "s" each representing the location of the center-of-gravity W of the container cargo vehicle and the length b of the portion supporting the container 11, provided that "k/m" is a constant value. As described above, the length b differs between at the front portion and at the rear portion of the container chassis 12 and, therefore, the maximum peak amplitude (vertex of convex peak) resides at two locations where the rolling phenomenon significantly appears in the direction in which the amplitude of rolling increases.

That is to say, the maximum peak amplitude includes one that is originating from the coupler 13 as a coupling member for connection between the front portion of the container chassis 12 and the tractor 10 and another that is originating from the rear cross beam 21 positioned in the rear portion of the container chassis 12. And, from the consideration of formula (5), the frequency corresponding to the latter maximum peak amplitude is larger than that of the former one.

In addition, between these frequencies, there is a minimum peak amplitude (valley of concave negative peak) at which the rolling phenomenon is impeded from appearing in the direction in which the amplitude of roiling decreases. This minimum peak amplitude is a peak originating from the center-of-gravity W of the container cargo vehicle in the front-rear direction.

Based upon the above-described consideration, the location of center-of-gravity W of the container cargo vehicle in the front-rear direction is expressed in a formula as shown below.

The relationship between the rolling frequency "v" and the horizontal length "b" of the portion that supports the container 11 is represented from formula (5) as follows.

$$v = \frac{\sqrt{\frac{kb^2}{2m} - gl}}{2\pi\sqrt{(l^2 + s^2)\cos\alpha}}$$

$$v^2 = \frac{\frac{kb^2}{2m} - gl}{4\pi^2(l^2 + s^2)\cos\alpha}$$

$$\frac{kb^2}{2m} = v^2 4\pi^2(l^2 + s^2)\cos\alpha + gl$$

$$b^2 = \frac{8m\pi^2(l^2 + s^2)\cos\alpha}{k}v^2 + \frac{2mgl}{k}$$

$$b = \sqrt{\frac{8m\pi^2(l^2 + s^2)\cos\alpha}{k}v^2 + \frac{2mgl}{k}}$$

Here, if the term other than rolling frequency "v" and the horizontal length "b" are combined, as a constant term, into C and $C_0$, this provides a simplified representation as given in the following formula (11).

$$\therefore b = \sqrt{Cv^2 + C_0} \quad (11)$$

Therefore, if both the rolling frequency "v" when external disturbance acts on the front portion of the container 11 and the rolling frequency "v" when external disturbance acts on the rear portion of the container 11, and the substantial horizontal length of the portion which supports the container 11 at both the locations are obtained, it becomes possible to find C and $C_0$, and, therefore, formula (11) becomes an equation capable of deriving the horizontal length "b" for any rolling frequency "v".

Here, if the combination of the horizontal length b and the rolling frequency "v" corresponding to the front portion of the container 11 and the combination of the horizontal length "b" and the rolling frequency "v" corresponding to the rear portion of the container 11 are denoted as $(b_1, v_1)$ and $(b_2, v_2)$, respectively, the following combinations are given.

$$\begin{cases} b_1 = \sqrt{Cv_1^2 + C_0} \\ b_2 = \sqrt{Cv_2^2 + C_0} \end{cases}$$

This simultaneous equation is solved to obtain the following formula (12).

$$\therefore b = \sqrt{\frac{b_1^2 - b_2^2}{v_1^2 - v_2^2}v^2 + \frac{b_2^2 v_1^2 - b_1^2 v_2^2}{v_1^2 - v_2^2}} \qquad (12)$$

In this formula (12), "$b_2$" is the substantial horizontal length (hereinafter sometimes referred to as length of "rear cross beam 21") of the member which supports the container 11 at the location of the rear portion of the container 11, and is the value that is determined as a constant. On the other hand, "$b_1$" is the substantial horizontal length of the member which supports the container 11 in the location of the front portion of the container 11, and is the value that is geometrically determined as a constant from "$b_c$" (the diameter of the coupler 13 of the tractor 10). "$v_1$" is the frequency of rolling generated when external disturbance acts on the front portion of the container 11, in a perpendicular direction from the road surface 204. "$v_2$" is the frequency of rolling generated when external disturbance acts on the rear portion of the container 11, in a perpendicular direction from the road surface 204.

Next, "$b_g$" (the substantial horizontal length of the member which supports the container 11 in the location of the center-of-gravity W of the container cargo vehicle in the front-rear direction) is specified.

This length "$b_g$" is found from formula (13) when the frequencies ("$v_1$", "$v_2$", "$v_g$") are all known (that is, when the arithmetic unit 15 succeeds in specifying, with the aid of the motion detector 14, the frequencies "$v_g$", "$v_1$", "$v_s$"). In addition, "$v_g$" is the frequency of rolling when external disturbance acts in a perpendicular direction from the road surface 204 in the location of the center-of-gravity W.

$$b_g = \sqrt{\frac{b_1^2 - b_2^2}{v_1^2 - v_2^2}v_g^2 + \frac{b_2^2 v_1^2 - b_1^2 v_2^2}{v_1^2 - v_2^2}} \qquad (13)$$

Here, as can be understood from FIG. 7, the geometrical relationship between "$b_1$" (the substantial horizontal length of the member which supports the container 11), "$b_c$" (the diameter of the coupler 13 of the tractor 10), "$b_g$" (the substantial horizontal length of the member which supports the container 11 in the location of the center-of-gravity W), "$k_c$" (the length from the front portion of the container 11 to the center of the coupler 13), "$k_g$" (the length from the front portion of the container 11 to the location of the center-of-gravity W), and "p" (the front-rear length of the container 11) can be represented in the form of a linear ratio. Therefore, this relationship is formulated to obtain the following formula (14).

$$k_g = \frac{p - k_c}{b_2 - b_c}(b_g - b_c) + k_c \qquad (14)$$

By substitution of "$b_g$" (the substantial horizontal length of the member which supports the container 11 in the location of the center-of-gravity W of the container cargo vehicle in the front-rear direction) obtained by formula (13) in formula (14), "$k_g$" (the length from the front portion of the container 11 to the location of the center-of-gravity W) is derived.

Furthermore, the values "l" and "s" each representing the location of the center-of-gravity W of the container cargo vehicle, in the cross-section perpendicular to the front-rear direction of the container 11, and corresponding to the length "$k_g$" can be derived by use of the length "$b_g$" as "b" in formula (10), in conjunction with formula (9).

Second Method

Figure 8:
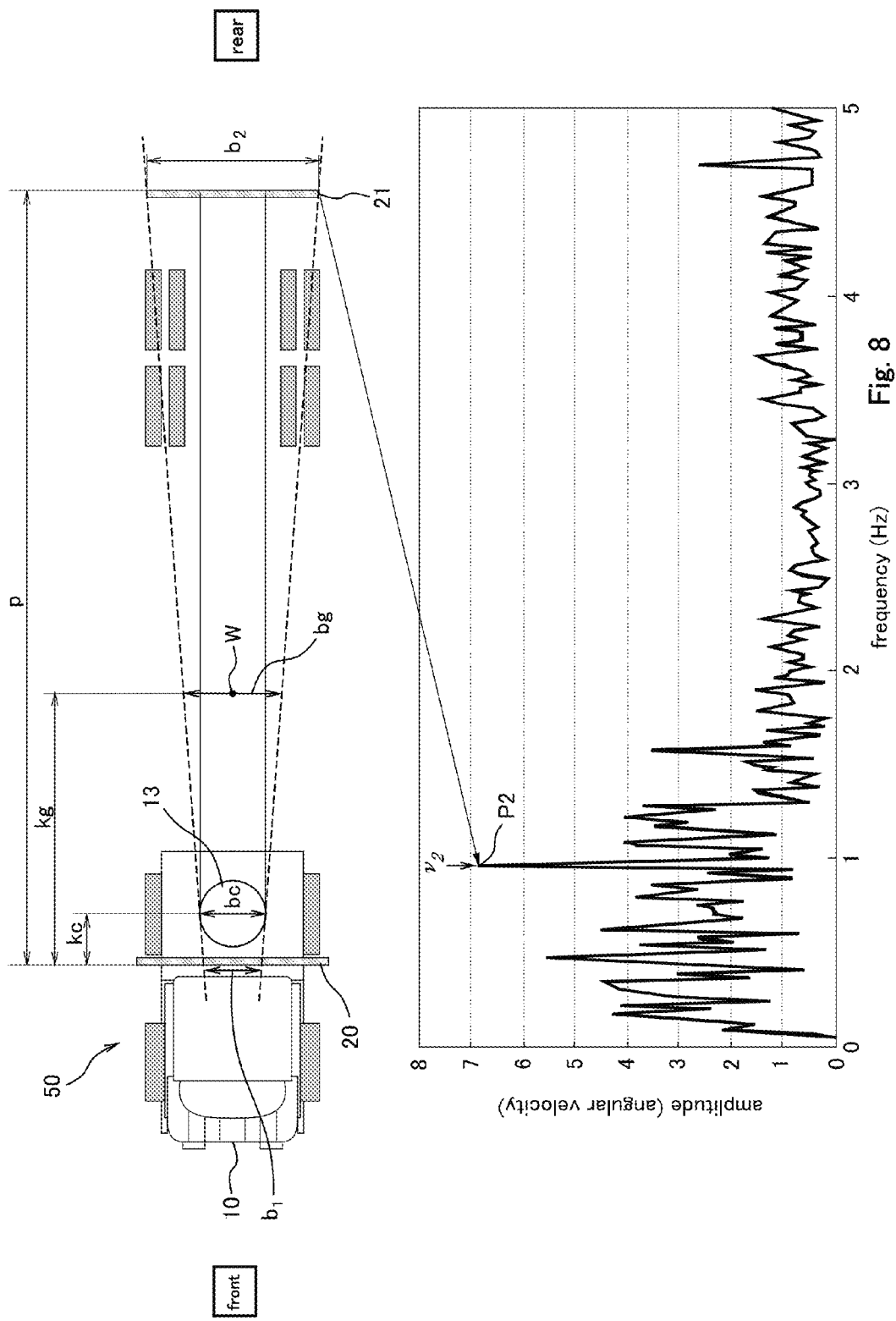
FIG. 8 is a schematic view showing an example in which a maximum peak amplitude of a rolling motion originating from a coupler has disappeared.

As shown in FIG. 8, when the maximum peak amplitude of the rolling motion originating from the coupler 13 has disappeared, the location of the center-of-gravity W of the container cargo vehicle in the travel direction can be formulated as follows.

Even when the travelling object travels on the paved road surface 204, external disturbances (hereinafter "small external disturbances") imparted to the travelling object due to small irregularities of the road surface 204 happens without fail. This happens irrespective of presence/absence of the coupler 13 unique to the trailer truck 50 and the magnitude of the diameter of the coupler 13. This merely means that if a width (vehicle width) of a support of the trailer truck 50 which transmits the small external disturbances is as small as the diameter "$b_c$" of the coupler 13, the small external disturbances are transmitted to the trailer truck 50 less easily.

If the vehicle width of the trailer truck 50 is long sufficient to transmit the small external disturbances even in the case where the trailer truck 50 travels on the paved road surface 204, a maximum peak amplitude in which a rolling phenomenon appears noticeably in a direction in which the amplitude of the rolling of the trailer truck 50 due to the small external disturbances increases should be observed. In actuality, as shown in FIG. 8, the maximum peak amplitude "P2" originating from the rear cross beam 21 located at the rear portion of the container chassis 12 is present.

From the above, the values "l" and "s" each representing the location of the center-of-gravity W of the container cargo vehicle, in the cross-section perpendicular to the travel direction of the container cargo vehicle at the rear portion of the container chassis 12 can be derived by assigning the horizontal substantial length "$b_2$" of the member that supports the container 11 in the rear portion of the container 11 to "b" in formula (8) and formula (9) and by assigning the rolling frequency "$v_2$" generated in the case where the external disturbances are applied from the road surface 204 to the rear portion of the container 11 in the direction perpendicular "v" in formula (8) and formula (9).

Regarding the oscillation (motion) of the container cargo vehicle during travel, it is assumed that the pitching and the rolling are generated from the same spring force.

Based on this assumption, the present inventors considered that coefficients in a motion equation which is obtained by either one of a left-right rolling (see FIGS. 3 and 4) of the container cargo vehicle in the cross-section perpendicular to the travel direction of the container cargo vehicle and a front-rear rolling (see FIGS. 5 and 6) of the container cargo vehicle in the cross-section perpendicular to the widthwise direction of the container cargo vehicle, either of which can be measured, can be used as coefficients in a motion equation which is obtained by the other.

When the motion equation of formula (8) is tied up by the rolling frequency "v" and the length "b" of the vehicle width of the container cargo vehicle corresponding to the rolling frequency "v", the following formula (15) is derived.

The formula (15) is a formulated formula, in which the vehicle width (width "b") of the container cargo vehicle is an independent variable and the left-right (widthwise) rolling frequency "v" of the container cargo vehicle is a dependent variable.

A coefficient "K" in formula (15) contains as variables, the values "l" and "s" each representing the location of the center-of-gravity W of the container cargo vehicle, in the cross-section perpendicular to the travel direction of the container cargo vehicle, the pitching frequency "v'" of the tractor 10 which moves with the vertical reciprocation of the container cargo vehicle, and the central angle "α" of left-right (horizontal) (widthwise) rolling of the container cargo vehicle. A coefficient "$K_0$" in formula (15) contains as variables, the values "l" and "s" each representing the location of the center-of-gravity W of the container cargo vehicle, in the cross-section perpendicular to the travel direction of the container cargo vehicle, and the central angle "α" of left-right (widthwise) rolling of the container cargo vehicle.

$$l^2 + s^2 = \frac{b^2 \pi^2 v'^2 - gl}{4\pi^2 v^2 \cos\alpha} \quad (8)$$

$$4\pi^2 v^2 (l^2 + s^2) \cos\alpha = b^2 \pi^2 v'^2 - gl$$

$$v^2 = \frac{v'^2}{4(l^2 + s^2)\cos\alpha} b^2 - \frac{gl}{4\pi^2(l^2 + s^2)\cos\alpha}$$

$$K = \frac{v'^2}{4(l^2 + s^2)\cos\alpha}$$

$$K_0 = -\frac{gl}{4\pi^2(l^2 + s^2)\cos\alpha}.$$

$$\therefore v^2 = Kb^2 + K_0 \quad (15)$$

In the left-right rolling (see FIGS. 3 and 4) of the container cargo vehicle, the rolling frequency "$v_2$" (measurement value) corresponding to the maximum peak amplitude "P2" originating from the rear cross beam 21, the pitching frequency "v'" (measurement value) of the tractor 10 which moves with the vertical reciprocation of the container cargo vehicle, and the length "$b_2$" (measurement value) of the rear cross beam 21 are known. The central angle "α" of left-right (widthwise) rolling of the container cargo vehicle can be actually measured (as described later).

By using the above stated measurement values, and according to formula (8) and formula (9), the values "l" and "s" each representing the location of the center-of-gravity W of the container cargo vehicle, in the cross-section perpendicular to the travel direction of the container cargo vehicle at the rear portion of the container chassis 12 can be derived. Thereby, the coefficient "K" and the coefficient "$K_0$" in the the left-right rolling (see FIGS. 3 and 4) of the container cargo vehicle, can be calculated.

On the above assumption, it is estimated that the calculated coefficient "K" and coefficient "$K_0$" are also coefficients of the front-rear rolling of the container cargo vehicle shown in FIGS. 5 and 6. Therefore, by assigning the total length of the container cargo vehicle (length "p" of the container 11 in the front-rear direction (travel direction)) to the length "b" in formula (15), an estimated value of the front-rear rolling frequency of "$v_{front-rear}$" of the container cargo vehicle can be calculated using formula (15). The pitching frequency "v'" of the tractor 10 which moves with the vertical reciprocation of the container cargo vehicle of FIGS. 5 and 6 is equal to the pitching frequency "v'" (measurement value) of that of the container cargo vehicle of FIGS. 3 and 4.

In the front-rear rolling (see FIGS. 5 and 6) of the container cargo vehicle, the pitching frequency "v'" (measurement value) of the tractor 10 which moves with the vertical reciprocation of the container cargo vehicle and the front-rear rolling frequency "$v_{front-rear}$" (estimated value) of the container cargo vehicle can be assigned to formula (8) and formula (9). After assigning these values, unknown values in simultaneous equation (how to expand the simultaneous equation will not described) are an inclination angle "$\alpha_{front-rear}$" of the container cargo vehicle in the cross-section perpendicular to the widthwise direction of the container cargo vehicle and a value "$s_{front-rear}$" representing the location of the center-of-gravity W of the container cargo vehicle, in the cross-section perpendicular to the widthwise direction of the container cargo vehicle. A value "$l_{front-rear}$" representing the location of the center-of-gravity W of the container cargo vehicle, in the cross-section perpendicular to the widthwise direction of the container cargo vehicle is equal to a value "$l_{left-right}$" (=the above identified "l"; see FIGS. 3 and 4) representing the location of the center-of-gravity W of the container cargo vehicle, in the cross-section perpendicular to the travel direction of the container cargo vehicle. That is, a length of a vertical line (perpendicular line) drawn vertically from the center-of-gravity W to a flat surface of the container chassis 12 is theoretically unique. The difference is that the length is seen on the basis of the flat surface of the container chassis 12 from the widthwise direction or from the front-rear direction.

Therefore, by using the above simultaneous equation, the value "$s_{front-rear}$" representing the location of the center-of-gravity W of the container cargo vehicle can be calculated. For example, in simultaneous equations of formula (8) and formula (9), by deleting "l", a relation formula in which unknown values are "$s_{front-rear}$" and "$\alpha_{front-rear}$" is derived (how to expand the simultaneous equation will not described). "$\alpha_{front-rear}$" can be derived by the same method as the method of deriving the central angle "$\alpha(\alpha_{left-right})$" (inclination angle "α") of horizontal (left-right) rolling of the center-of gravity W using a suitable detector (not shown).

As a result, "$s_{front-rear}$" is found. By using "$s_{front-rear}$", a length "$k_g$" from the front portion of the container 11 to the location of the center-of-gravity W can be derived.

In the above described manner, the center-of-gravity detecting system 100 of the present embodiment can attain all of three values "l", "s" and "$k_g$" representing the location of the center-of-gravity W of the container cargo vehicle in a three-dimensional space by either the first method or the second method.

Exemplary Operation of Center-of-Gravity Detecting System

Next, an exemplary detecting operation of a three-dimensional center-of-gravity location of the container cargo vehicle by the center-of-gravity detecting system 100 of the present embodiment will be described with reference to the drawings.

Figure 9:
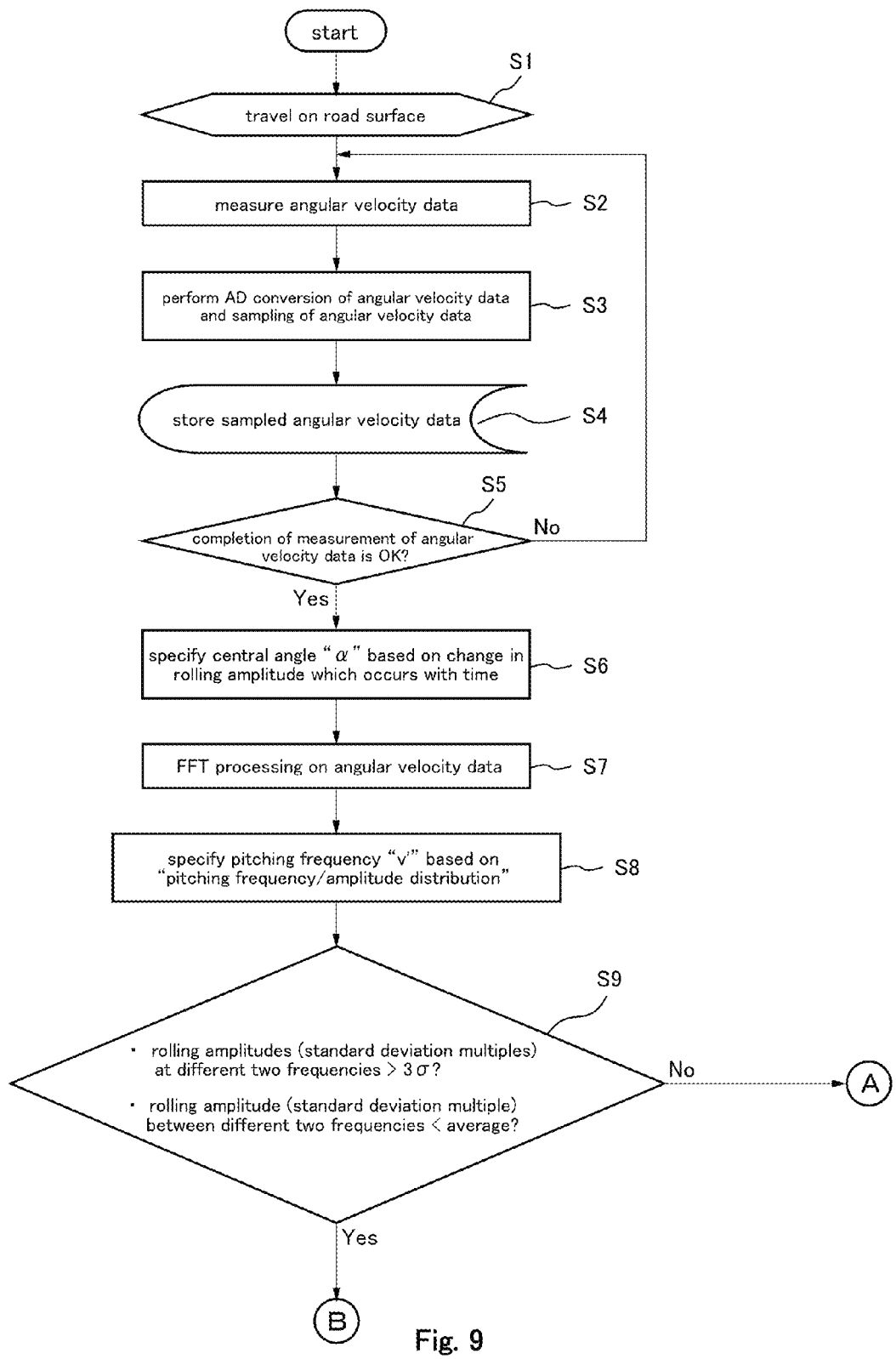
FIG. 9 is a flowchart showing an exemplary calculation routine of a three-dimensional center-of-gravity location of the container cargo vehicle during travel, the routine being executed by the center-of-gravity detecting system according to the embodiment of the present invention.
Figure 10:
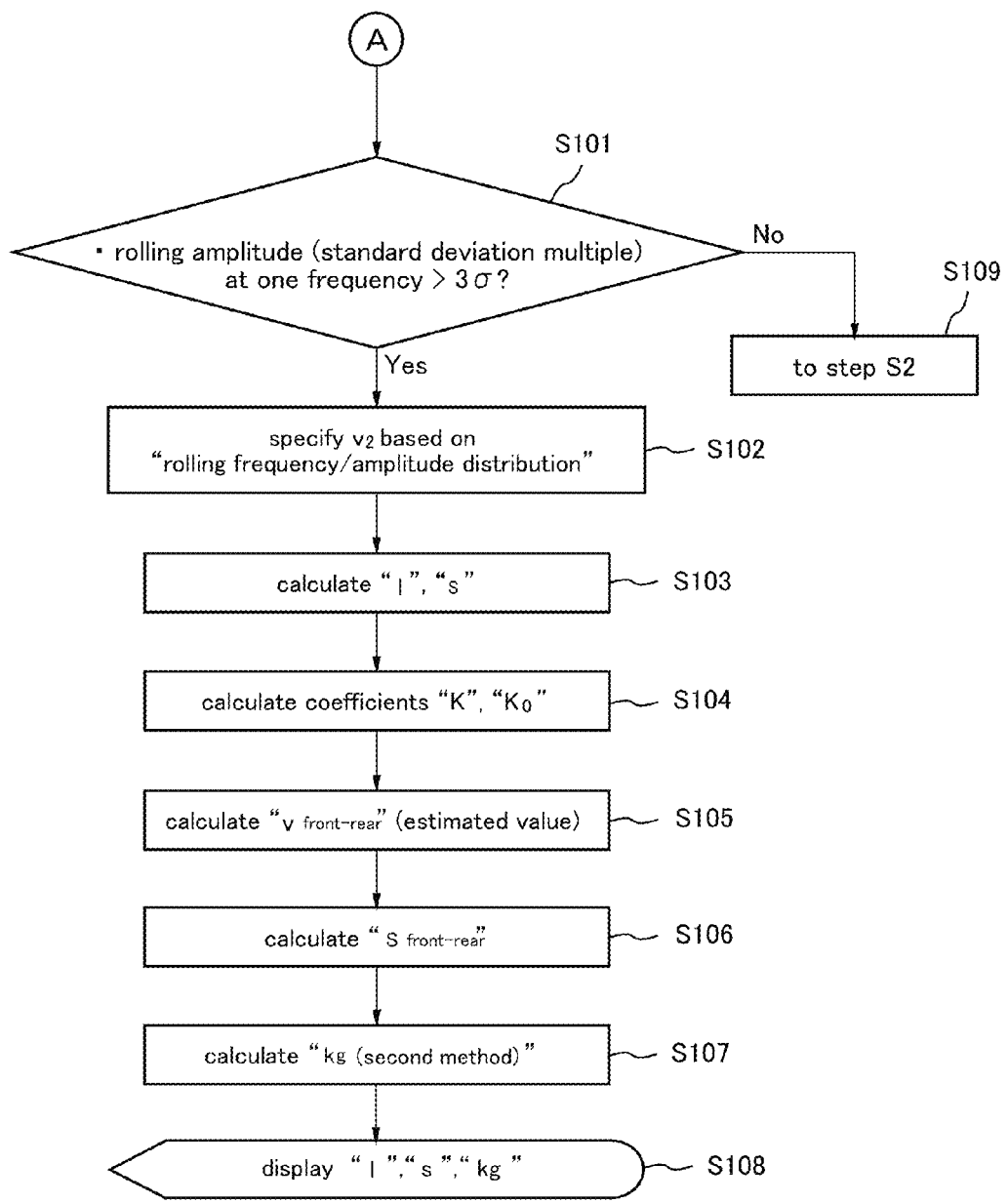
FIG. 10 is a flowchart showing an exemplary calculation routine of the three-dimensional center-of-gravity location of the container cargo vehicle during travel, the routine being executed by the center-of-gravity detecting system according to the embodiment of the present invention.
Figure 11:
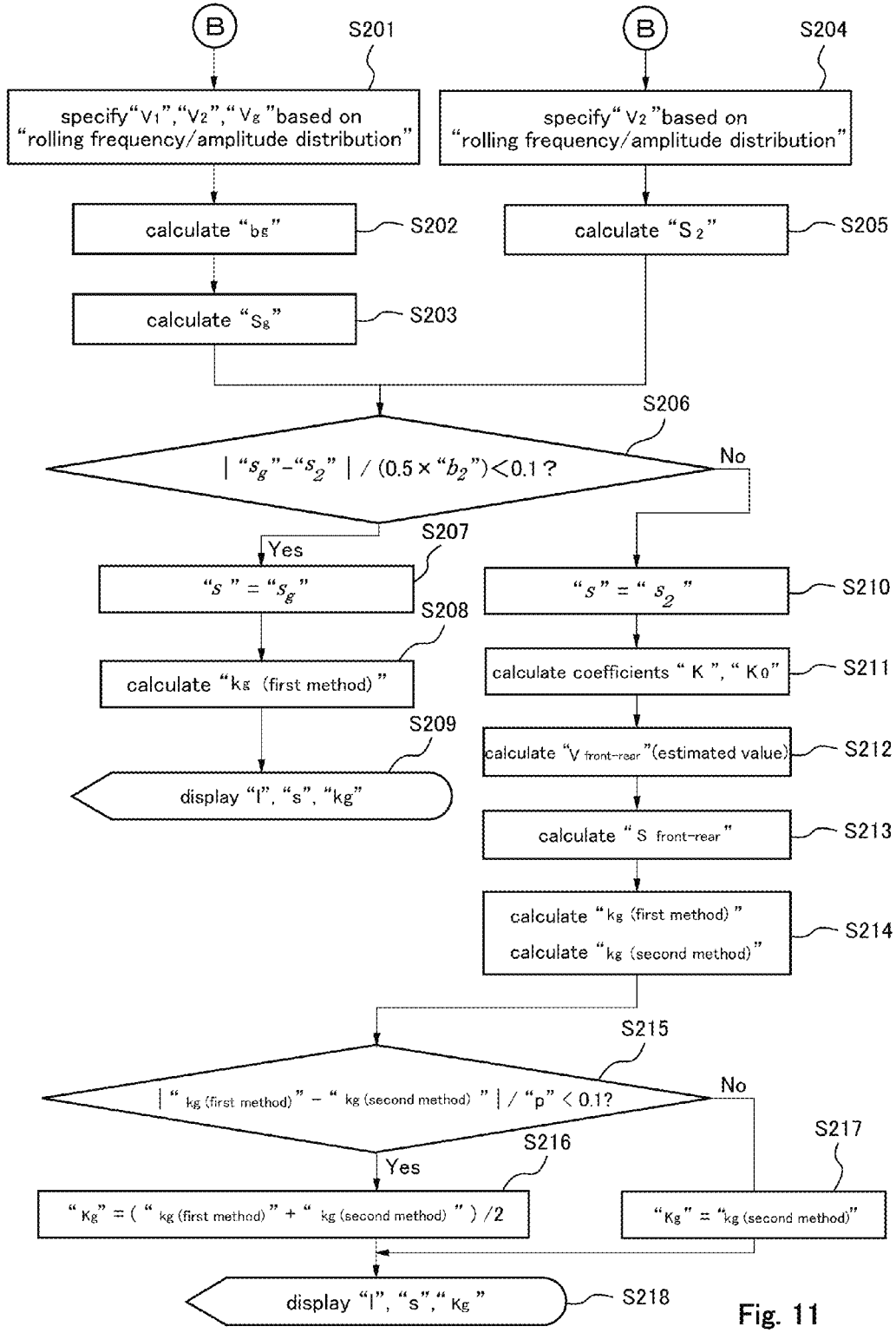
FIG. 11 is a flowchart showing an exemplary calculation routine of the three-dimensional center-of-gravity location of the container cargo vehicle during travel, the routine being executed by the center-of-gravity detecting system according to the embodiment of the present invention.

FIGS. 9, 10 and 11 are flowcharts showing an exemplary calculation routine of a three-dimensional center-of-gravity location, the routine being executed by the center-of-gravity detecting system according to the embodiment of the present invention.

When a power switch of the operation setting/display part 15c of the arithmetic unit 15 is pressed, a plurality of menus are displayed on a display screen (not shown) of the operation setting/display part 15c. By operating a selected button on the operation setting/display part 15c, the detecting operation of the three-dimensional center-of-gravity location as described below is initiated, anytime during the travel of the trailer truck 50.

In the execution of the detecting operation as described above, the operation instructions that an operator (e.g., a driver or a passenger of the tractor 10) needs to follow are message-displayed on a display screen of the operation setting/display part 15c. When the detecting operation of the three-dimensional center-of-gravity location is selected, the arithmetic part 15a of the arithmetic unit 15 reads out the calculation program for detecting the three-dimensional center-of-gravity location and prestored constants from the storage part 15b, and this calculation program is executed while controlling the arithmetic part 15a, the storage part 15b and the operation setting/display part 15c.

The constants include, for example, the front-rear length "p" of the container 11, the diameter "$b_c$" of the coupler 13 of the tractor 10, the length "$k_c$" from the front portion of the container 11 to a center of the coupler 13, the horizontal substantial length "$b_1$" of a member that supports the container 11 in the front portion of the container 11, the horizontal length "$b_2$" of a member that supports the container 11 in the rear portion of the container 11, the gravitational acceleration "g", and the circle ratio "$\pi$".

For a forty-feet marine container of standard specification, the constants "p" "$b_c$" "$k_c$" "$b_1$" and "$b_2$" are often standard values, and thus it is advantageous to store the constants "p" "$b_c$" "$k_c$" "$b_1$" and "$b_2$" in the storage part 15b, because the confirmation and inputting operations of the constants can be omitted, which is suitable.

Instead of this, a control method may be employed, in which the operator can input the constants "p" "$b_c$" "$k_c$" "$b_1$" and "$b_2$" in the storage part 15b, using the operation setting/display part 15c of the arithmetic unit 15 each time the detecting operation of the three-dimensional center-of-gravity location is executed.

As a preparation operation of the detecting operation of the three-dimensional center-of-gravity location of the container cargo vehicle, the tractor 10 which is towing the container 11 loaded with cargos and the container chassis 12 is traveled on a road surface 204 (step S1).

Thereupon, random external disturbances due to irregularities of the road surface 204 are transmitted to the vehicle body (container 11) of the trailer truck 50 through the suspensions 205. Accordingly, the motion detector 14 can detect the motions of the container cargo vehicle in the self-weight direction and the widthwise direction.

As an additional remark to the above, of the aforesaid prior art technologies, there is an example (for example, Patent Literatures 1, 5, and 6) in which data during travel of the truck along a curved road (for example, centrifugal force and lateral acceleration) are intentionally detected; however, such a technique may end up causing the truck during travel along a curve (during data acquisition) to undergo unstable travel motion (truck lateral rollover, in worst case), and there is still a question as to whether or not it is practical.

When the detecting operation of the three-dimensional center-of-gravity location is initiated by the manipulation of buttons of the operation setting/display part 15c conducted by the operator (for example, the driver of the tractor 10 or the passenger), the angular velocity data of pitching (vertical motion: vertical simple oscillation) corresponding to the vertical reciprocation motion of the center of gravity W and rolling (horizontal motion: horizontal (left-right) simple pendulum motion) of the center-of-gravity W are measured as analog signals by means of the angular velocity sensor 14a of the motion detector 14 (step S2). And, the analog angular velocity data are sampled, by the arithmetic unit 15 (arithmetic part 15a), as digital signals which have passed through the A/D converter 14b of the motion detector 14, for every predetermined sampling time (e.g., every 0.002 S (second)) prestored in the storage part 15b (step S3). The digital angular velocity data thus sampled are stored in the storage part 15b, together with time-series data (step S4).

Although an example of the detection of the angular velocity data by means of the angular velocity sensor 14a is described here, it can be assumed that, in a situation when the vehicle is travelling in a straight line along a flow of cars, the state of rolling is sin θ=θ and, therefore, it may be possible to use an acceleration sensor to detect data in place of an angular velocity sensor.

Next, the arithmetic part 15a determines whether or not to terminate the measurement of angular velocity data by the angular velocity sensor 14a (step S5). If the arithmetic part 15a determines that measurement of angular velocity data may be terminated ("Yes" in step S5), then the routine moves to subsequent processing steps (step S6 and subsequent steps). On the other hand, if the arithmetic part 15a determines that the measurement of the angular velocity data should not be terminated ("No" in step S5), then the operation of the aforesaid step S2 to step S4 is continued.

The determination as to whether or not the measurement may be terminated may be made, based upon a predetermined measurement time that is derived from a required total number of samples prestored in the storage part 15b and the aforesaid sampling time. For example, if the number of samples, at which the statistical error of sampling becomes sufficiently diminished, is 4096 (since FFT is an analysis intended for the number of integer multipliers of 2, $2^{12}$ is shown here as an example number of samples) and, if the sampling time is 0.002 S, then a minimum required measurement time is: 4096×0.002 S ≃8 S. Therefore, in this case, the arithmetic part 15a determines that the measurement of angular velocity data may be terminated after an elapse of 8 seconds or more since the time when the angular velocity sensor 14a started measuring the angular velocity data. If a usage form, in which the three-dimensional center-of-gravity location of the container 11 is to be updated in real time during travel of the trailer truck 50, is assumed, preferably the time of measurement should be kept as short as possible, but if too short, this means a less number of samples, thereby resulting in an increase in a statistical error.

Additionally, instead of such a determination operation, the arithmetic part 15a may determine whether or not to terminate the measurement of angular velocity data, based on the presence or absence of the manipulation of a measurement terminating button of the operation setting/display part 15c by the operator.

The measurement of angular velocity data conducted in such a short period of time serves as a basis for the elimination of numerical values "k" and "m" in the formulation of the above illustrated simultaneous equations, based on the precondition that the elastic coefficient "k" of the suspension 205 and the weight "m" of the container cargo vehicle are invariable during a period of the measurement of the angular velocity data.

When the measurement of angular velocity data by the angular velocity sensor 14a is completed, the arithmetic part 15a reads the time-series angular velocity data stored in the storage part 15b. Thus, from a distribution (hereinafter "change in rolling amplitude" which occurs with a passage of time) representing a time change of the rolling amplitude (angle), the central angle "α" (inclination angle "α") of the horizontal (left-right) rolling of the center-of gravity W of the container cargo vehicle corresponding to a time average value in a change of the rolling amplitude which occurs with a passage of time can be specified (step S6).

Then, the arithmetic part 15a applies fast Fourier transform (FFT) to the time-series angular velocity data stored in the storage part 15b to convert the angular velocity data to the data of amplitude corresponding to a frequency (step S7). Specifically, the angular velocity data is converted into rolling data representing a correlation between the horizontal rolling frequency of the container cargo vehicle and the horizontal rolling amplitude of the container cargo vehicle, and converted into pitching data representing a correlation between the pitching frequency of the tractor 10 which moves with the vertical reciprocation of the container cargo vehicle and its pitching amplitude.

This results in a distribution (e.g., distribution shown in FIG. 12 as will be described later; hereinafter abbreviated as "pitching frequency/amplitude distribution") representing a correlation between the pitching frequency of the tractor 10 which moves with the vertical reciprocation of the container cargo vehicle and its pitching amplitude. This also results in a distribution (e.g., distribution shown in FIGS. 7 and 8; hereinafter abbreviated as "rolling frequency/amplitude distribution") representing a correlation between a horizontal (left-right) rolling frequency of the container cargo vehicle and a horizontal (left-right) rolling amplitude of the container cargo vehicle.

Then, from the above "pitching frequency/amplitude distribution", the pitching frequency "v'" of the tractor 10 which moves with the vertical reciprocation of the container cargo vehicle, can be specified (step S8). That is, a frequency corresponding to the maximum amplitude of the pitching may be selected as the pitching frequency "v'".

Then, it is determined whether or not maximum peak amplitudes of the rolling motion are present at different two frequencies in the "rolling frequency/amplitude distribution". In other words, it is determined whether or not the maximum peak amplitude of the rolling motion originating from the coupler 13 has disappeared.

In the above determination method, a method based on an average and standard deviation of the amplitude (actual measurement data) of the "rolling frequency/amplitude" distribution will be described herein. This determination method can be constructed variously using mathematical statistics. Therefore, a technique of the present specification is not limited to this.

Specifically, the average and standard deviation (δ) of the rolling amplitude are found. In a case where the rolling amplitude (standard deviation multiple) exceeds three times (3δ) as large as the standard deviation in terms of a multiple of the standard deviation (δ) assuming that this average is zero, this value is equal to or less than 0.3% in a universe. Because of this, if the rolling amplitude (standard deviation multiple) exceeds three times (3δ) as large as the standard deviation, it can be determined that this rolling amplitude shows a clear peak. There should be a valley between the maximum peak amplitudes of the rolling motion at different two frequencies. Whether or not there is such a valley can be determined depending on whether or not the rolling amplitude (standard deviation multiple) takes a value smaller than the average (=0).

Based on the above, the arithmetic part 15a determines whether or not the rolling amplitudes (standard deviation multiples) at different two frequencies exceed three times (3δ) as large as the standard deviation (step S9). In addition, the arithmetic part 15a determines whether or not the rolling amplitude (standard deviation multiple) is smaller than the average between these two frequencies (step S9).

If the rolling amplitudes (standard deviation multiples) at different two frequencies exceed three times (3δ) as large as the standard deviation, and if the rolling amplitude (standard deviation multiple) is smaller than the average between these two frequencies ("Yes" in step S9), it is determined that there are maximum peak amplitudes of the rolling motion at different two frequencies, in the "rolling frequency/amplitude distribution", and the operation in step S201 to step S216 in FIG. 11 is performed.

On the other hand, if the rolling amplitudes (standard deviation multiples) at different two frequencies do not exceed three times (3δ) as large as the standard deviation, or if the rolling amplitude (standard deviation multiple) is not smaller than the average between these two frequencies ("No" in step S9), it is determined that there are not maximum peak amplitudes of the rolling motion at different two frequencies, in the "rolling frequency/amplitude distribution", and the operation in step S101 to step S109 in FIG. 10 is performed.

First, the operation in step S101 to step S108 in FIG. 10 will be described.

Even when it is determined there are not maximum peak amplitudes of the rolling motion at different two frequencies, in step S9, there is a case where the rolling amplitude (standard deviation multiple) at one frequency exceeds three times (3δ) as large as the standard deviation. In this case, it is presumed that there is only one maximum peak amplitude of the rolling motion. Specifically, in the container cargo vehicle, only one maximum peak amplitude "P2" originating from the rear cross beam 21 located at the rear portion of the container chassis 12 is observed, as shown in FIG. 8.

So, the arithmetic part 15a determines whether or not the rolling amplitude (standard deviation multiple) at one frequency exceeds three times (3δ) as large as the standard deviation (step S101).

If "Yes" in step S101, it is determined that the rolling frequency "$v_2$" corresponding to the maximum peak amplitude "P2" originating from the rear cross beam 21, is present. Thus, the rolling frequency "$v_2$" can be specified based on the "rolling frequency/amplitude distribution" (step S102). By using the rolling frequency "$v_2$", and according to the second method, the three values "l", "s" and "$k_g$" representing the location of the center-of-gravity W of the container cargo vehicle in the three-dimensional space can be calculated in step S103 to step S107 as described below.

On the other hand, if "No" in step S101, it is determined that there is no clear peak in the rolling amplitude. As a result, the three values "l", "s" and "$k_g$" representing the location of the center-of-gravity W of the container cargo vehicle in the three-dimensional space can not be calculated. Therefore, the routine returns to step S2 (step S109), and step S2 and the following steps are performed again.

Then, in step S103, the arithmetic part 15a reads the constant "$b_2$" prestored in the storage part 15b, and calculates the values "l", "s" representing the location of the center-of-gravity W of the container cargo vehicle, in the cross-section perpendicular to the travel direction of container cargo vehicle, using the pitching frequency "v'" in step S8, the rolling frequency "$v_2$" in step S102, the central angle "α" of the horizontal (left-right) rolling of the center-of-gravity W of the container cargo vehicle in step S6, and the length "$b_2$" of the rear cross beam 21 of the container cargo vehicle according to formula (8) and formula (9) below (note that in formula (8) and formula (9), "b" is "$b_2$").

$$4\pi^2 v^2 (l^2 + s^2)\cos\alpha = b^2 \pi^2 v'^2 - gl \quad (8)$$

$$\therefore l^2 + s^2 = \frac{b^2 \pi^2 v'^2 - gl}{4\pi^2 v^2 \cos\alpha}$$

$$\therefore s = \left(\frac{\pi^2 v'^2 b^2}{g} - l\right)\tan\alpha \quad (9)$$

Then, the arithmetic part 15a calculates the following coefficients "K", "$K_0$" using the calculated values "l", "s" in step S103, the pitching frequency "v'" in step S8, and the central angle "α" of the rolling of the center-of gravity W of the container cargo vehicle in step S6 (step S104).

$$K = \frac{v'^2}{4(l^2 + s^2)\cos\alpha}$$

$$K_0 = -\frac{gl}{4\pi^2(l^2 + s^2)\cos\alpha}.$$

Then, the arithmetic part 15a reads the front-rear length "p" (constant) of the container cargo vehicle, which is prestored in the storage part 15b, and assigns the constant "p" to "b" in formula (15) as shown below. Then, the arithmetic part 15a calculates the front-rear rolling frequency "$v_{front-rear}$" (estimated value) of the container cargo using the coefficients "K", "$K_0$" in step S104 according to formula (15) (step S105).

$$v^2 = Kb^2 + K_0 \quad (15)$$

Then, the arithmetic part 15a reads the constant "p" prestored in the storage part 15b, and calculates the value "$s_{front-rear}$" representing the location of the center-of-gravity W of the container cargo vehicle, in the cross-section perpendicular to the horizontal direction of the container cargo vehicle, using the pitching frequency "v'" in step S8, the rolling frequency "$v_{front-rear}$" (estimated value) in step S105, and the constant "p", according to formula (8) and formula (9) (note that in formula (8) and formula (9), "b" is "p" and "v" is "$v_{front-rear}$") (step S106). For example, in the simultaneous equation of formula (8) and formula (9), a relation in which "$s_{front-rear}$" and "$\alpha_{front-rear}$" are unknown is obtained by deleting "l". "$\alpha_{front-rear}$" can be derived by the same method as the method in step S6 by using a suitable detector (not shown). Thus, "$s_{front-rear}$" is found.

Finally, the arithmetic part 15a calculates (converts) the length "$k_g$" from the front portion of the container 11 to the location of the center-of-gravity W, using the calculated value "$s_{front-rear}$" in step S106 (step S107). The arithmetic part 15a displays on the display screen of the operation setting/display part 15c, the three values "l", "s" and "$k_g$" representing the location of the center-of-gravity W of the container cargo vehicle in the three-dimensional space (step S108). Thus, the series of detecting routines of the three-dimensional center-of-gravity location ends.

Next, the operation in step S201 to step S217 in FIG. 11 will be described.

In the case where there are maximum peak amplitudes of the rolling motion at different two frequencies, the values "s", "$k_g$" representing the location of the center-of-gravity W of the container cargo vehicle in the three-dimensional space can be calculated by both the "first method" and the "second method".

The value "l" representing the location of the center-of-gravity W of the container cargo vehicle in the three-dimensional space becomes the same value irrespective of whether the method is either the first method or the second method. Therefore, the value "l" can be suitably derived in step S203 or step S205 as will be described later. Also, as will be described later, in step S213, "$s_{front-rear}$" can be calculated without using "l". Therefore, illustration and description of the calculation operation of the value "l" will not be given here.

In the center-of-gravity detecting system 100 of the present embodiment, as described below, the center-of-gravity location data "s", "$k_g$" derived by the "first method" and the "second method" are compared to each other, and thus, the location of the center-of-gravity can be calculated with high accuracy.

Firstly, from the rolling frequency/amplitude distribution", the frequencies "$v_1$", "$v_g$" and "$v_2$" are specified (step S201, step S204).

That is, two frequencies corresponding to maximum peak amplitudes (apexes) of the rolling from the perspective of a lowest value of the rolling frequency may be selected, and a frequency corresponding to a minimum peak amplitude (negative peak amplitude; bottom amplitude) located between these maximum peak amplitudes (in the present embodiment, in an almost mid portion) may be selected. By doing so, the selected three frequencies correspond to the frequencies "$v_1$", "$v_g$" and "$v_2$", respectively, in this order from the lowest value.

The arithmetic part 15a reads the constants "$b_c$", "$b_1$", and "$b_2$", prestored in the storage part 15b and calculates the horizontal (left-right) substantial length "$b_g$" of the member that supports the container 11 in the location of the center-of-gravity W, using the frequencies "$v_1$", "$v_g$" and "$v_2$" in step S201 according to formula (13) (step S202).

$$b_g = \sqrt{\frac{b_1^2 - b_2^2}{v_1^2 - v_2^2}v_g^2 + \frac{b_2^2 v_1^2 - b_1^2 v_2^2}{v_1^2 - v_2^2}} \quad (13)$$

Then, the arithmetic part 15a calculates a value "$s_g$" representing the location of the center-of-gravity W of the container cargo vehicle, using the pitching frequency "v'" in step S8, the rolling frequency "$v_g$" in step S201, the central angle "α" of the rolling of the center-of-gravity W of the container cargo vehicle in step S6, and "$b_g$" in step S202, according to formula (8) and formula (9) (note that "b" is "$b_g$" and "v" is "$v_g$" in formula (8) and formula (9) (step S203).

At the same time, the arithmetic part 15a reads the constant "$b_2$", prestored in the storage part 15b and calculates a value "$s_2$" representing the location of the center-of-gravity W of the container cargo vehicle, using the pitching frequency "v'" in step S8, the rolling frequency "$v_2$" in step S204, the central angle "α" of the rolling of the center-of-gravity W of the container cargo vehicle in step S6, and the constant "$b_2$" according to formula (8) and formula (9) (note that "b" is "$b_2$" and "v" is "$v_2$" in formula (8) and formula (9)) (step S205).

To accurately calculate the horizontal (left-right) length "s" from the axle center 500 to the center-of-gravity W of the container cargo vehicle, it is necessary to estimate an error between "$s_g$" and "$s_2$" and evaluate a magnitude of the error between them. As a criterion of evaluation of the error, a method of selecting the length "$b_2$" of the rear cross beam 21 of the container cargo vehicle is illustrated. Such a method can be constructed using mathematical statistics. Therefore, the technique in the specification is not limited to this.

A maximum value of the vehicle width of the container cargo vehicle is the length "$b_2$" of the rear cross beam 21 of the container cargo vehicle. Because of this, the horizontal (left-right) length "s" from the axle center 500 to the center-of-gravity W of the container cargo vehicle should be smaller than a half of the length "$b_2$" of the rear cross beam 21 of the container cargo vehicle (in other words, a relation of "s"<0.5×"$b_2$" is always satisfied.) Therefore, as an evaluation value of the error between "$s_g$" and "$s_2$", it may be reasonable to select |"$s_g$"−"$s_2$"|/(0.5×"$b_2$"). Accordingly, in the center-of-gravity detecting system 100 of the present embodiment, it is determined that the error value between "$s_g$" and "$s_2$" is small in the case of an inequation |"$s_g$"−"$s_2$"|/(0.5×"$b_2$")<0.1. In other words, it is determined that "$s_g$" is substantially equal to "$s_2$" in the case of an inequation |"$s_g$"−"$s_2$"|/(0.5×"$b_2$")<0.1.

Thus, the arithmetic part 15a reads the constant "$b_2$" prestored in the storage part 15b, and determines whether or not |"$s_g$"−"$s_2$"|/(0.5×"$b_2$")<0.1 is satisfied, using "$s_g$" in step S203, "$S_2$" in step S205, and the length "$b_2$" of the rear cross beam 21 of the container cargo vehicle (step S206).

If "Yes" in step S206, it is determined that "$s_g$" is substantially equal to "$s_2$".

In this case, it is assumed that "$s_g$" is the horizontal (left-right) length "s" from the axle center 500 of the container cargo vehicle to the center-of-gravity W of the container cargo vehicle (step S207).

Then, the arithmetic part 15a reads the constants "p", "$k_c$" and "$b_c$" prestored in the storage part 15b, and calculates a value (hereinafter abbreviated as "$k_g$ (first method)") representing the location of the center-of-gravity W of the container cargo vehicle, using the constants "p", "$k_c$" and "$b_c$" and the length "$b_g$" in step S202, according to formula (14) (step S208), and determines this as the length "$k_g$" from the front portion of the container 11 to the location of the center-of-gravity W.

$$k_g = \frac{p - k_c}{b_2 - b_c}(b_g - b_c) + k_c \quad (14)$$

Finally, the arithmetic part 15a displays on the display screen of the operation setting/display part 15c, the three values "l", "s" and "$k_g$" representing the location of the center-of-gravity W of the container cargo vehicle in the three-dimensional space (step S209). Thus, the series of detecting routines of the three-dimensional center-of-gravity location ends.

On the other hand, if "No" in step S206, it is determined that "$s_g$" is not substantially equal to "$s_2$".

In this case, it is assumed that "$s_2$" is the horizontal (left-right) length "s" from the axle center 500 of the container cargo vehicle to the center-of-gravity W of the container cargo vehicle (step S210). Because the maximum peak amplitude tends to be clearer than the minimum peak amplitude (negative peak: bottom amplitude), it is presumed that "$s_2$" is preferably selected.

Then, the arithmetic part 15a calculates the value (hereinafter abbreviated as "$k_g$ (second method)") representing the location of the center-of-gravity W of the container cargo vehicle by the same method as the method in step S105 to step S107 (step S211 to step S214), and calculates "$k_g$ (first method)" by the same method as the method in step S208 (step S214).

To accurately calculate the length "$k_g$" from the front portion of the container 11 to the center-of-gravity W, it is necessary to estimate an error between "$k_g$ (first method)" and "$k_g$ (second method)" and evaluate a magnitude of the error between them.

The length "$k_g$" from the front portion of the container 11 to the center-of-gravity W should be smaller than the front-rear total length "p" of the container cargo vehicle (in other words, a relation of "$k_g$"<"p" is always satisfied.)

Therefore, as the evaluation value of the error between "$k_g$ (first method)" and "$k_g$ (second method)", it would be reasonable to select |"$k_g$ (first method)"−"$k_2$ (second method)"|/"p"|.

Like step S206, the arithmetic part 15a reads the constant "p" prestored in the storage part 15b, and determines whether or not the inequation |"$k_g$ (first method)"−"$k_2$ (second method)"|/"p"<0.1, using "$k_g$ (first method)" in step S214, "$k_g$ (second method)" in step S214 and the front-rear length "p" of the container 11 (step S215).

If "Yes" in step S215, it is determined that "$k_g$ (first method)" is substantially equal to "$k_g$ (second method)". Therefore, the arithmetic part 15a calculates an average value between "$k_g$ (first method)" and "$k_g$ (second method)", and determines that the average value is the length "$k_g$" from the front portion of the container 11 to the center-of-gravity W (step S216).

On the other hand, if "No" in step S215, it is determined that "$k_g$ (first method)" is not substantially equal to "$k_g$ (second method)". Therefore, the arithmetic part 15a determines that "$k_g$ (second method)" is the length "$k_g$" from the front portion of the container 11 to the center-of-gravity W (step S217).

Because the maximum peak amplitude tends to be clearer than the minimum peak amplitude (negative peak amplitude: bottom amplitude), it is presumed that "$k_g$ (second method)" is preferably selected.

Finally, the arithmetic part 15a displays on the display screen of the operation setting/display part 15c, the three values "l", "s" and "$k_g$" representing the location of the center-of-gravity W of the container cargo vehicle in the three-dimensional space (step S218). Thus, the series of detecting routines of the three-dimensional center-of-gravity location ends.

As described above, the center-of-gravity detecting system 100 of the present embodiment includes the motion detector 14 for detecting the vertical motion of the container cargo vehicle in the self-weight direction during travel and the rolling of the container cargo vehicle in the widthwise direction during travel, and the arithmetic unit 15.

The arithmetic unit 15 obtains, by using the motion detector 14, the vertical motion frequency "v'" in the self-weight direction, the widthwise rolling frequency "$v_2$" corresponding to the width "$b_2$" of the container cargo vehicle, and calculates the center-of-gravity location "l" of the container cargo vehicle in the self-weight direction in the cross-section perpendicular to the travel direction of the travelling object, and the center-of-gravity location "s" of the container cargo vehicle in the widthwise direction in the cross-section perpendicular to the travel direction of the travelling object, using the vertical motion frequency "v'" in the self-weight direction, the widthwise rolling frequency "$v_2$", the central angle "α" of the widthwise rolling, and the width "$b_2$".

The arithmetic unit 15 derives the coefficient "K" and the coefficient "$K_0$" in the formula in which a relation between the width "b" of the container cargo vehicle and the rolling frequency "v" of the container cargo vehicle is formulated, using the center-of-gravity location "l" in the self-weight direction, the center-of-gravity location "s" in the widthwise direction, the vertical motion frequency "v'" in the self-weight direction, and the central angle "α" of the widthwise rolling, and calculates using the coefficient "K" and the coefficient "$K_0$" in the formula, the rolling frequency "$v_{front-rear}$" (estimated value) in the travel direction, in the case where the width "b" is the length "p" of the container cargo vehicle in the travel direction, in this formula.

In addition, the arithmetic unit 15 calculates "$k_g$" representing the center-of-gravity location of the container cargo vehicle in the travel direction, using the vertical motion frequency "v'" in the self-weight direction, the rolling frequency "$v_{front-rear}$" (estimated value) in the travel direction, the center-of-gravity location "l" in the self-weight direction, and the length "p" of the container cargo vehicle in the travel direction.

In addition, the above formula is represented by formula (15) as illustrated below which is formulated such that the width "b" of the container cargo vehicle is an independent variable and the rolling frequency "v" of the container cargo vehicle is a dependent variable. The arithmetic unit 15 assigns the length "p" of the container cargo vehicle in the travel direction to the independent variable in formula (15) to derive the rolling frequency "$v_{front-rear}$" of the container cargo vehicle in the travel direction.

$$v^2 = Kb^2 + K_0 \quad (15)$$

wherein the coefficient "K" contains as variables the center-of-gravity location "l" in the self-weight direction, the center-of-gravity location "s" in the widthwise direction, the vertical motion frequency "v'" in the self-weight direction, and the central angle "α" of the widthwise rolling, while the coefficient "$K_0$" contains as variables the center-of-gravity location "l" in the self-weight direction, the center-of-gravity location "s" in the widthwise direction, and the central angle "α" of the widthwise rolling.

With the above described configuration, the center-of-gravity detecting system 100 of the present embodiment is capable of calculating the three-dimensional center-of-gravity location of the container cargo vehicle during travel, even when the road surface on which the trailer truck 50 is traveling is smooth. Moreover, the center-of-gravity detecting system 100 of the present embodiment is capable of calculating the three-dimensional center-of-gravity location of automobiles having a uniform vehicle width in the travel direction, such as trucks, buses and passenger cars (see modified example as will be described later). Therefore, the center-of-gravity detecting system 100 of the present embodiment is capable of universally deriving the three-dimensional center-of-gravity location of the travelling object such as the container cargo vehicle and the automobile during travel, as compared to the prior art detecting system.

Modified Example

Although description has been given of the example in which the center-of-gravity detecting system 100 of the present embodiment calculates the center-of-gravity location of the container cargo vehicle in the three-dimensional space, application of the center-of-gravity detecting system 100 of the present embodiment is not limited to this.

As described above, the technology disclosed in this specification can be applied to various transportation devices including trucks, buses, passenger cars, railway cars, ships and airplanes (during landing and takeoff, for example) as well as the container transportation vehicle (container cargo vehicle).

In the present modified example, the outline of an exemplary configuration of the center-of-gravity detecting system used to calculate the three-dimensional center-of-gravity location of a passenger car during travel will be described below (drawings thereof are omitted).

In addition, in the present modified example, the outline of an exemplary configuration of the center-of-gravity detecting system used to calculate the three-dimensional center-of-gravity location of the railway car during travel, will be described, and a result of the calculation of the three-dimensional center-of-gravity location of the railway car during travel, which is executed by the center-of-gravity detecting system, will be illustrated.

Firstly, the calculation of the three-dimensional center-of-gravity location of the passenger car during travel will be described.

In calculation of the center-of-gravity location of a rectangular passenger car that has a rectangular shape having a short front-rear direction, it is theoretically consistent to use a motion detector including a combination of an angular velocity sensor of a polar coordinate system whose angular velocity sensitive axes are adjusted in the widthwise direction of the passenger car and an acceleration sensor of a linear coordinate system whose acceleration sensitive axes are adjusted in the vertical direction of the passenger car, unlike the motion detector 14 for the trailer truck 50. The motion detector comprised of the angular velocity sensor and the acceleration sensor is directly mounted to a vehicle body of the passenger car, and thereby the motion detector may measure angular velocity data and acceleration data during travel of the passenger car by moving the passenger car on a road surface for a specified time.

In this measurement, the arithmetic part (arithmetic unit) applies fast Fourier transform (FFT) to time-series angular velocity data and acceleration data stored in the storage part to convert the angular velocity data and the acceleration data to the amplitude data that correspond to respective frequencies of the angular velocity data and the acceleration data.

This results in the "rolling frequency/amplitude distribution" and the "vertical acceleration frequency/amplitude distribution", which relate to the passenger car.

In the "rolling frequency/amplitude distribution" in this case, FFT distribution does not show two peak amplitudes at different two frequencies and shows one peak amplitude, because of an uniform vehicle width of the passenger car.

By the above described manner, the center-of-gravity location of the passenger car in the three-dimensional space during travel can be calculated in such a manner that the frequency corresponding to the peak amplitude of the "rolling frequency/amplitude distribution" is the rolling frequency "v" in formula (8) and formula (9), the vehicle width of the passenger car (which is substantially the same in the front/rear direction) of the passenger car is the length b in formula (8) and formula (9), and the frequency corresponding to the maximum amplitude of the acceleration frequency/amplitude distribution is the frequency "v'" in formula (8) and formula (9), according to the operation flow shown in FIG. 10 based on the "second method".

Next, the calculation of the three-dimensional center-of-gravity location of the railway car during travel will be described.

FIG. 13 is a view showing the result of calculation of the three-dimensional center-of-gravity location of the railway car during travel, which is performed by the center-of-gravity detecting system according to the modified example of the present invention.

In calculation of the center-of-gravity location of a railway car 300 that has a rectangular shape, it is theoretically consistent to use a motion detector including a combination of an angular velocity sensor of a polar coordinate system whose angular velocity sensitive axes are adjusted in the widthwise direction of the railway car 300 and an acceleration sensor of a linear coordinate system whose acceleration sensitive axes are adjusted in the vertical direction of the railway car 300, unlike the motion detector 14 for the trailer truck 50. The motion detector (not shown) comprised of the angular velocity sensor and the acceleration sensor is directly mounted to a vehicle body of the railway car 300, and thereby the motion detector may measure angular velocity data and acceleration data during travel of the railway car 300 by moving the railway car 300 on a rail track for a specified time.

In this measurement, the arithmetic part (arithmetic unit; not shown) applies fast Fourier transform (FFT) to time-series angular velocity data and acceleration data stored in the storage part to convert the angular velocity data and the acceleration data to the amplitude data that correspond to respective frequencies of the angular velocity data and the acceleration data.

This results in the "rolling frequency/amplitude distribution" (see FIG. 13A) and the "vertical acceleration frequency/amplitude distribution" (see FIG. 13B), which relate to the railway car 300 as shown in FIG. 13.

Figure 13A:
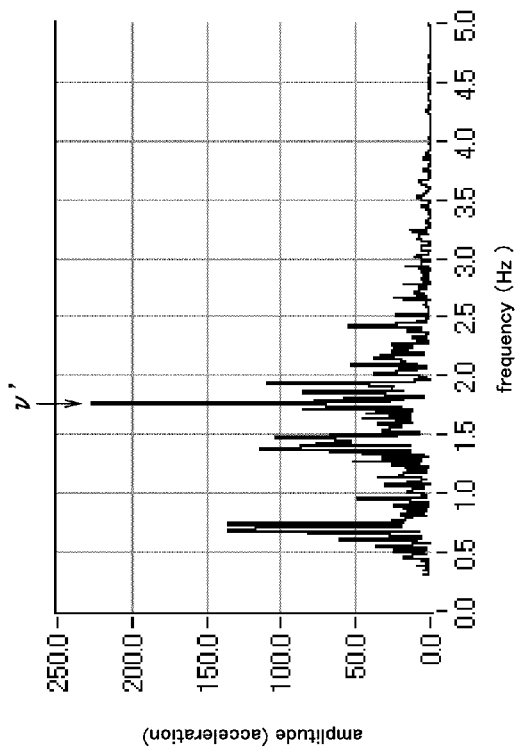
FIG. 13 is a view showing a three-dimensional center-of-gravity location of a railway car which is a result of calculation performed by a center-of-gravity detecting system according to a modified example of the present invention.
Figure 13B:
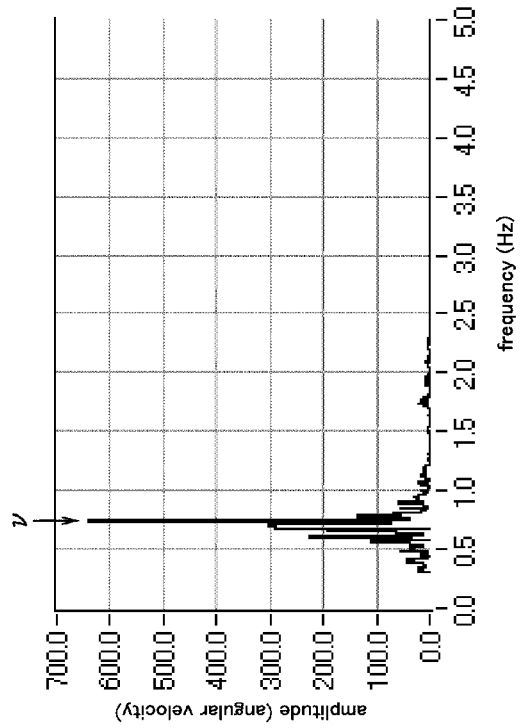

In the "rolling frequency/amplitude distribution" in this case, as shown in FIG. 13A, FFT distribution does not show two peak amplitudes at different frequencies and shows one peak amplitude, because of an uniform vehicle width of the railway car 300. In other words, this "rolling frequency/amplitude distribution" is a typical example in which the frequency "$v_1$" of FIG. 7 has disappeared.

By the above described manner, the center-of-gravity location of the railway car 300 in the three-dimensional space during travel can be calculated in such a manner that the frequency corresponding to the peak amplitude of the "rolling frequency/amplitude distribution" (see FIG. 13A) is the rolling frequency "v" in formula (8) and formula (9), the vehicle width of the railway car 300 (which is substantially the same in the railway car 300 in the front/rear direction) is the length b in formula (8) and formula (9), and the frequency corresponding to the maximum amplitude of the vertical acceleration frequency/amplitude distribution (see FIG. 13B) is the frequency "v'" in formula (8) and formula (9), according to the operation flow shown in FIG. 10 based on the "second method".

Figure 13C:
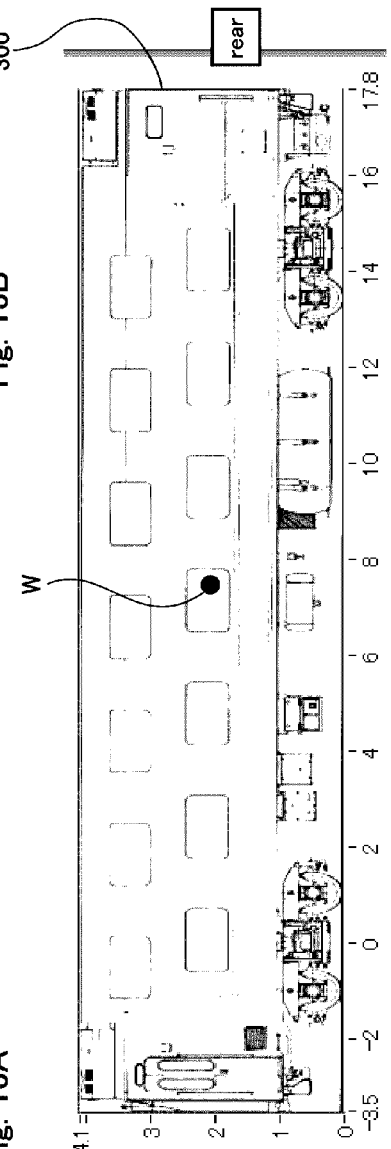
Figure 13D:
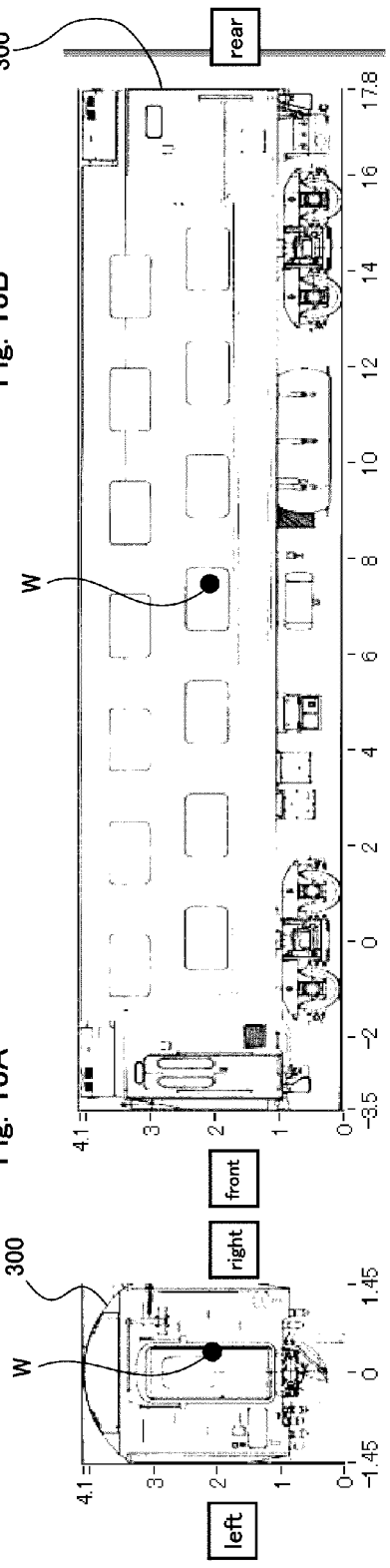

That is, as shown in FIG. 13C, the location of the center-of-gravity W of the railway car 300 in the cross-section perpendicular to the front-rear direction (travel direction) of the railway car 300 can be specified. In addition, as shown in FIG. 13D, the location of the center-of-gravity W of the railway car 300 in the travel direction (front-rear direction of the railway car 300) of the railway car 300 can be specified.

Example

Hereinafter, a description will be given of validation as to difficulty of actual measurement of the peak of the amplitude of the front-rear rolling "$v_{front-rear}$" of the container cargo vehicle by the motion detector 14.

Figure 12:
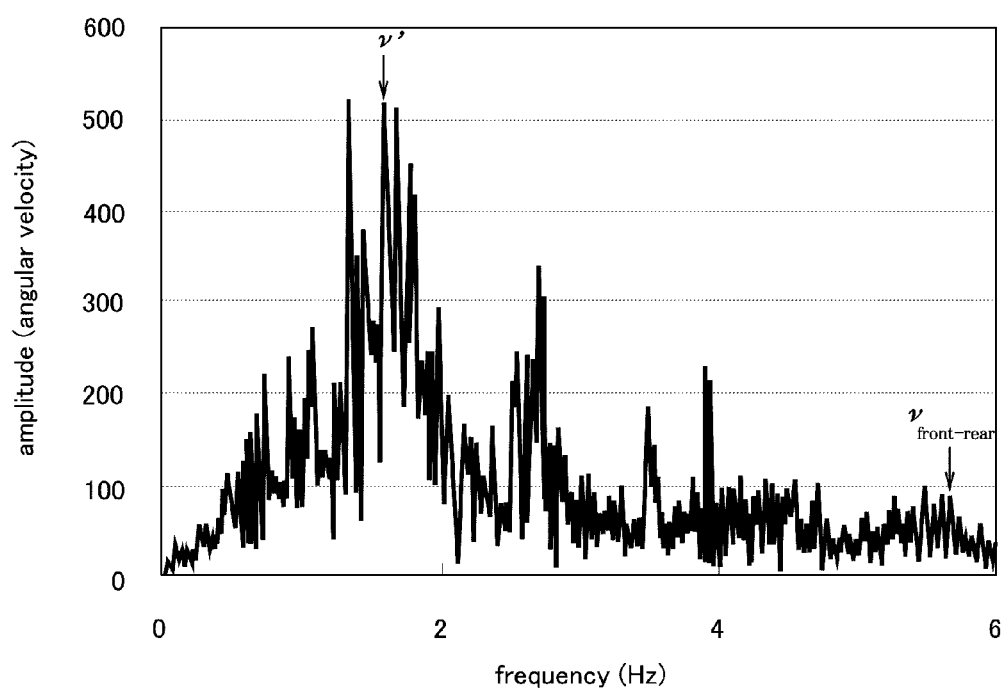
FIG. 12 is a view showing an example of "pitching frequency/amplitude distribution" in a case where there is only one peak amplitude of a rolling motion.

FIG. 12 is a view showing an example of "pitching frequency/amplitude distribution" in a case where there is only one peak amplitude of the rolling motion.

As shown in FIG. 12, in the "pitching frequency/amplitude distribution", only a peak of the amplitude of the pitching "v'" which moves with the vertical simple oscillation of the container cargo vehicle is observed. By the "second method", the front-rear rolling "$v_{front-rear}$" (estimated value) is calculated, and is represented on a drawing. As can be seen from FIG. 12, the estimated value is present in a location in which the frequency of the rolling "$v_{front-rear}$" is a little under 6 Hz.

From the above, it could be validated that it is difficult to actually measure the peak of the amplitude of the unique rotational motion (rolling) with a left-right axis of the trailer truck 50, i.e., the peak of the amplitude of the front-rear rolling "$v_{front-rear}$" of the container cargo vehicle, from the "pitching frequency/amplitude distribution" in FIG. 12.

The above result of validation clearly supports usefulness of calculation of the front-rear rolling "$v_{front-rear}$" (estimated value) by the "second method" of the present embodiment.

Numerous modifications and alternative embodiments of the present invention will be apparent to those skilled in the art in view of the foregoing description. Accordingly, the description is to be construed as illustrative only, and is provided for the purpose of teaching those skilled in the art the best mode of carrying out the present invention. The details of the structure and/or function may be varied substantially without departing from the spirit of the present invention and all modifications that come within the scope of the appended claims are reserved.

INDUSTRIAL APPLICABILITY

The center-of-gravity detecting system of the present invention is capable of universally deriving the three-dimensional center-of-gravity location of the travelling object during travel.

Accordingly, the present invention can be applied to the calculation of three-dimensional center-of-gravity location of various types of transportation devices during travel, including container transportation vehicles (container cargo vehicles), trucks, buses, passenger cars, railway cars, ships and airplanes (for example, during landing and takeoff).

REFERENCE SIGNS LISTS 10 tractor
11 container 12 container chassis
13 coupler
14 motion detector
14a angular velocity sensor
14b A/D converter
15 arithmetic unit
15a arithmetic part
15b storage part
15c operation setting/display part
50 trailer truck (container transportation vehicle)
100 center-of-gravity detecting system
201 vertical center line
202 axle position line
204 road surface
205 suspension
206 rolling center line

The invention claimed is:

1. A center-of-gravity detecting system comprising:
a motion detector for detecting a vertical motion of a travelling object in a self-weight direction of the travelling object during travel, and a horizontal motion of the travelling object in a widthwise direction of the travelling object during travel; and
an arithmetic unit;
wherein the motion detector includes an angular velocity sensor mounted on the travelling object, the angular velocity sensor comprising an angular velocity sensitive axis that is adjustable in the widthwise direction of the travelling object;
wherein the arithmetic unit obtains a frequency of the vertical motion in the self-weight direction and a frequency of the horizontal motion in the widthwise direction corresponding to a width of the traveling object, by using the motion detector;
the arithmetic unit calculates a center-of-gravity location of the travelling object in the self-weight direction in a cross-section perpendicular to the travel direction and a center-of-gravity location of the travelling object in the widthwise direction in the cross-section perpendicular to the travel direction, using the frequency of the vertical motion in the self-weight direction, the frequency of the horizontal motion in the widthwise direction, a central angle of the horizontal motion in the widthwise direction, and the width of the traveling object;
the arithmetic unit derives coefficients in a formula in which a relation between the width of the travelling object and the frequency of the horizontal motion in the widthwise direction is formulated, using the center-of-gravity location in the self-weight direction, the center-of-gravity in the widthwise direction, the frequency of the vertical motion in the self-weight direction, and the central angle of the horizontal motion in the widthwise direction;
the arithmetic unit calculates a frequency of the horizontal motion in the travel direction, using the coefficients in the formula, in a case where the width of the travelling object is a length of the travelling object in the travel direction, in the formula; and
the arithmetic unit calculates a center-of-gravity location of the travelling object in the travel direction, using the frequency of the vertical motion in the self-weight direction, a frequency of the horizontal motion in the travel direction, the center-of-gravity location in the self-weight direction, and the length of the travelling object in the travel direction.

2. The center-of-gravity detecting system according to claim 1,
wherein the formula is represented by a formulated formula (X), in which the width (b) of the travelling object is an independent variable and the frequency "v" of the horizontal motion of the travelling object in the widthwise direction is a dependent variable; and
the arithmetic unit calculates the frequency of the horizontal motion of the travelling object in the travel direction by assigning the length of the travelling object in the travel direction to the independent variable in the formula (X);

$$v^2 = Kb^2 + K0 \qquad (X)$$

wherein "K" contains as variables the center-of-gravity location in the self-weight direction, the center-of-gravity location in the widthwise direction, the vertical motion frequency in the self-weight direction, and the central angle of the horizontal motion in the widthwise direction; and
"K0" contains as variables the center-of-gravity location in the self-weight direction, the center-of-gravity location in the widthwise direction, and the central angle of the horizontal motion in the widthwise direction.

3. The center-of-gravity detecting system according to claim 1, wherein the traveling object is a container cargo vehicle towed by a towing vehicle.

4. The center-of-gravity detecting system according to claim 1,
wherein when the vertical motion in the self-weight direction corresponds to a vertical reciprocation motion in which a center-of-gravity of the traveling object is a mass point, and the horizontal motion in the widthwise direction corresponds to a horizontal simple pendulum motion in which an axle center of the traveling object in the width direction is a support point, and the center-of-gravity of the traveling object is a mass point,
the arithmetic unit converts output data of the motion detector into horizontal motion data that represents a correlation between a frequency and an amplitude of the simple pendulum motion, and obtains a frequency of the simple pendulum motion in correspondence with a peak amplitude of the simple pendulum motion which is derived from the width of the traveling object on the basis of the horizontal motion data,
the arithmetic unit further converts the output data of the motion detector into vertical motion data that represents a correlation between a frequency and an amplitude of the reciprocation motion, and obtains a frequency of the reciprocation motion corresponding to a maximum amplitude of the reciprocation motion on the basis of the vertical motion data, and
the arithmetic unit calculates the center-of-gravity location of the travelling object in the self-weight direction in the cross-section perpendicular to the travel direction and the center-of-gravity location of the travelling object in the widthwise direction in the cross-section perpendicular to the travel direction, using the width, the obtained frequency of the simple pendulum motion, the obtained frequency of the reciprocation, and a central angle of the simple pendulum motion.

5. The center-of-gravity detecting system according to claim 1,
wherein the vertical motion in the self-weight direction and the horizontal motion in the widthwise direction are motions due to external disturbances applied to the traveling object during travel on a road surface, by irregularities of the road surface.

6. The center-of-gravity detecting system according to claim 1,
wherein the angular velocity sensitive axes of the angular velocity sensor is adjusted in the self-weight direction.

7. The center-of-gravity detecting system according to claim 1,
wherein the angular velocity sensor is configured to detect biaxial angular velocity.

8. The center-of-gravity detecting system according to claim 1,
wherein the motion detector includes an amplifier circuit, a filter circuit, and a digitizer circuit.

* * * * *